(12) United States Patent
Rhoads et al.

(10) Patent No.: US 7,286,684 B2
(45) Date of Patent: *Oct. 23, 2007

(54) SECURE DOCUMENT DESIGN CARRYING AUXILIARY MACHINE READABLE INFORMATION

(75) Inventors: Geoffrey B. Rhoads, West Linn, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 791 days.

This patent is subject to a terminal disclaimer.

(21) Appl. No.: 10/460,092

(22) Filed: Jun. 11, 2003

(65) Prior Publication Data

US 2003/0215112 A1    Nov. 20, 2003

Related U.S. Application Data

(63) Continuation-in-part of application No. 09/939,298, filed on Aug. 24, 2001, now Pat. No. 6,804,379, which is a continuation of application No. 09/127,502, filed on Jul. 31, 1998, now Pat. No. 6,345,104, application No. 10/460,092, and a continuation-in-part of application No. 09/553,112, filed on Apr. 20, 2000, now abandoned, application No. 10/460,092, and a continuation-in-part of application No. 10/165,751, filed on Jun. 6, 2002, now Pat. No. 6,754,377, which is a continuation of application No. 09/074,034, filed on May 6, 1998, now Pat. No. 6,449,377, which is a continuation-in-part of application No. 08/438,159, filed on May 8, 1995, now Pat. No. 5,850,481.

(60) Provisional application No. 60/131,005, filed on Apr. 22, 1999, provisional application No. 60/082,228, filed on Apr. 16, 1998.

(51) Int. Cl.
*H04K 1/00* (2006.01)
(52) U.S. Cl. .......................... 382/100; 380/54
(58) Field of Classification Search ................ 382/100, 382/135, 232; 380/210, 287, 54; D19/11; 283/72, 85, 93, 113, 57, 901, 902
See application file for complete search history.

(56) References Cited

U.S. PATENT DOCUMENTS 3,918,567 A    11/1975    Kittredge .................... 197/1 R (Continued)

FOREIGN PATENT DOCUMENTS

DE    29 43 436 A1  *   5/1981

(Continued)

OTHER PUBLICATIONS

Brassil et al., "Electronic Marking and Identification Techniques to Discourage Document Copying," IEEE Proc. INFOCOM'94, Jun. 1994, pp. 1278-1287.*

(Continued)

*Primary Examiner*—Andrew W. Johns

(57) ABSTRACT

A two dimensional pattern design for secure documents serves as both a machine readable code and an aesthetic part of the documents' design. A method for generating the design generates a variable auxiliary message comprising message values and maps the message values to a two dimensional pattern of areas on the document. The areas each comprise an arrangement of pixels on the printed document. Depending on a value of the message mapped to a corresponding area, the method assigns a visible structure to the corresponding area. Different visible structures are assignable to a single value of the message to create a visible design having a desired aesthetic appearance.

25 Claims, 13 Drawing Sheets

U.S. PATENT DOCUMENTS

| | | | |
|---|---|---|---|
| 3,969,830 A | 7/1976 | Grasham | 35/2 |
| 4,164,745 A | 8/1979 | Cielo et al. | 346/140 R |
| 4,297,729 A | 10/1981 | Steynor et al. | 360/40 |
| 4,571,489 A | 2/1986 | Watanabe | 235/379 |
| 4,588,212 A | 5/1986 | Castagnoli | 283/91 |
| 4,660,859 A * | 4/1987 | Natesh | 283/70 |
| 4,723,149 A | 2/1988 | Harada | 355/14 R |
| 4,739,377 A | 4/1988 | Allen | 355/133 |
| 4,908,873 A | 3/1990 | Philibert et al. | 382/34 |
| 4,943,093 A | 7/1990 | Melling et al. | 283/83 |
| 5,040,059 A | 8/1991 | Leberl | 358/107 |
| 5,091,966 A | 2/1992 | Bloomberg et al. | 382/21 |
| 5,178,418 A | 1/1993 | Merry et al. | 283/73 |
| 5,216,724 A | 6/1993 | Suzuki et al. | 382/7 |
| 5,257,119 A | 10/1993 | Funada et al. | 358/438 |
| 5,284,364 A | 2/1994 | Jain | 283/87 |
| 5,305,199 A | 4/1994 | LoBiondo et al. | 364/403 |
| 5,315,098 A | 5/1994 | Tow | 235/494 |
| 5,321,470 A | 6/1994 | Hasuo et al. | 355/201 |
| 5,336,871 A | 8/1994 | Colgate, Jr. | 235/494 |
| 5,337,361 A | 8/1994 | Wang et al. | 380/51 |
| 5,367,319 A | 11/1994 | Graham | 347/2 |
| 5,374,976 A * | 12/1994 | Spannenburg | 355/201 |
| 5,377,269 A | 12/1994 | Heptig et al. | 380/25 |
| 5,390,003 A | 2/1995 | Yamaguchi et al. | 355/201 |
| 5,390,259 A | 2/1995 | Withgott et al. | 382/9 |
| 5,416,307 A | 5/1995 | Danek et al. | 235/449 |
| 5,424,807 A | 6/1995 | Ohmura | 355/201 |
| 5,426,710 A | 6/1995 | Suzuki et al. | 382/135 |
| 5,430,664 A | 7/1995 | Cargill et al. | 364/550 |
| 5,434,427 A | 7/1995 | Crane et al. | 250/556 |
| 5,436,974 A | 7/1995 | Kovanen | 380/51 |
| 5,437,897 A | 8/1995 | Tanaka et al. | 428/29 |
| 5,453,968 A | 9/1995 | Veldhuis et al. | 369/84 |
| 5,469,222 A | 11/1995 | Sprague | 348/580 |
| 5,483,602 A | 1/1996 | Stenzel et al. | 382/135 |
| 5,483,658 A | 1/1996 | Grube et al. | 395/800 |
| 5,488,664 A | 1/1996 | Shamir | 380/54 |
| 5,533,144 A | 7/1996 | Fan | 382/135 |
| 5,539,841 A | 7/1996 | Huttenlocher et al. | 382/218 |
| 5,541,741 A | 7/1996 | Suzuki | 358/450 |
| 5,550,932 A * | 8/1996 | Blaylock et al. | 382/139 |
| 5,557,742 A | 9/1996 | Smaha et al. | 395/186 |
| 5,568,268 A | 10/1996 | Tsuji et al. | 358/296 |
| 5,568,550 A | 10/1996 | Ur | 380/3 |
| 5,572,010 A * | 11/1996 | Petrie | 235/494 |
| 5,583,614 A | 12/1996 | Hasuo et al. | 355/201 |
| 5,611,575 A * | 3/1997 | Petrie | 283/67 |
| 5,613,004 A | 3/1997 | Cooperman et al. | 380/28 |
| 5,629,770 A * | 5/1997 | Brassil et al. | 358/261.1 |
| 5,633,952 A | 5/1997 | Outa et al. | 382/165 |
| 5,636,292 A | 6/1997 | Rhoads | 382/232 |
| 5,640,467 A | 6/1997 | Yamashita et al. | 382/181 |
| 5,647,017 A | 7/1997 | Okubo et al. | 382/100 |
| 5,652,626 A | 7/1997 | Kawakami et al. | 348/463 |
| 5,652,802 A | 7/1997 | Graves et al. | 382/135 |
| 5,661,574 A | 8/1997 | Kawana | 358/501 |
| 5,663,952 A | 9/1997 | Gentry, Jr. | 370/252 |
| 5,671,277 A | 9/1997 | Ikenoue et al. | 380/7 |
| 5,678,155 A | 10/1997 | Miyaza | 399/366 |
| 5,687,236 A | 11/1997 | Moskowitz et al. | 380/28 |
| 5,692,073 A | 11/1997 | Cass | 382/219 |
| 5,708,717 A | 1/1998 | Alasia | 380/51 |
| 5,710,636 A | 1/1998 | Curry | 358/298 |
| 5,710,834 A | 1/1998 | Rhoads | 382/232 |
| 5,721,788 A | 2/1998 | Powell et al. | 382/100 |
| 5,727,092 A | 3/1998 | Sandford, II et al. | 382/251 |
| 5,735,547 A | 4/1998 | Morelle et al. | 283/67 |
| 5,745,604 A | 4/1998 | Rhoads | 382/232 |
| 5,748,763 A | 5/1998 | Rhoads | 382/115 |
| 5,748,783 A | 5/1998 | Rhoads | 382/232 |
| 5,761,686 A | 6/1998 | Bloomberg | 707/529 |
| 5,772,249 A | 6/1998 | Guex et al. | 283/93 |
| 5,772,250 A * | 6/1998 | Gasper | 283/114 |
| 5,790,693 A | 8/1998 | Graves et al. | 382/135 |
| 5,790,697 A | 8/1998 | Munro et al. | 382/135 |
| 5,796,824 A | 8/1998 | Hasebe et al. | 380/4 |
| 5,822,448 A | 10/1998 | Graves et al. | 382/135 |
| 5,825,892 A | 10/1998 | Braudaway et al. | 380/51 |
| 5,838,814 A * | 11/1998 | Moore | 382/115 |
| 5,841,886 A | 11/1998 | Rhoads | 382/115 |
| 5,843,564 A * | 12/1998 | Gasper et al. | 428/211 |
| 5,850,481 A | 12/1998 | Rhoads | 382/232 |
| 5,857,038 A | 1/1999 | Owada et al. | 382/284 |
| 5,901,224 A | 5/1999 | Hecht | 380/4 |
| 5,905,810 A | 5/1999 | Jones et al. | 382/135 |
| 5,919,730 A * | 7/1999 | Gasper et al. | 503/201 |
| 5,949,903 A | 9/1999 | Outa et al. | 382/165 |
| 5,951,055 A | 9/1999 | Mowry, Jr. | 283/93 |
| 5,974,548 A | 10/1999 | Adams | 713/200 |
| 5,982,956 A | 11/1999 | Lahmi | 382/306 |
| 6,081,345 A * | 6/2000 | Curry | 358/1.9 |
| 6,086,706 A * | 7/2000 | Brassil et al. | 156/277 |
| 6,104,812 A * | 8/2000 | Koltai et al. | 380/51 |
| 6,212,285 B1 | 4/2001 | Bender et al. | 382/100 |
| 6,252,963 B1 | 6/2001 | Rhoads | 380/54 |
| 6,285,776 B1 | 9/2001 | Rhoads | 382/100 |
| 6,343,138 B1 | 1/2002 | Rhoads | 382/100 |
| 6,345,104 B1 | 2/2002 | Rhoads | 382/100 |
| 6,427,020 B1 | 7/2002 | Rhoads | 382/100 |
| 6,449,377 B1 * | 9/2002 | Rhoads | 382/100 |
| 6,522,771 B2 | 2/2003 | Rhoads | 382/100 |
| 6,549,638 B2 | 4/2003 | Davis et al. | 382/100 |
| 6,567,534 B1 * | 5/2003 | Rhoads | 382/100 |
| 6,580,819 B1 | 6/2003 | Rhoads | 382/135 |
| 6,674,886 B2 | 1/2004 | Davis et al. | 382/135 |
| 6,724,912 B1 | 4/2004 | Carr et al. | 382/100 |
| 6,754,377 B2 * | 6/2004 | Rhoads | 382/135 |
| 6,959,100 B2 * | 10/2005 | Rhoads | 382/100 |
| 6,985,600 B2 * | 1/2006 | Rhoads et al. | 382/100 |
| 2001/0022848 A1 | 9/2001 | Rhoads | 382/100 |

FOREIGN PATENT DOCUMENTS

| | | |
|---|---|---|
| DE | 195 21 969 C1 | 2/1997 |
| EP | 0 234 885 B1 | 4/1991 |
| EP | 0 493 091 A1 | 6/1992 |
| EP | 0 551 016 A1 | 7/1993 |
| EP | 0 581317 A2 | 2/1994 |
| EP | 0 319 524 B1 | 6/1994 |
| EP | 0 178 132 B2 | 8/1994 |
| EP | 0 651 337 A1 | 5/1995 |
| EP | 0 664 642 A2 | 7/1995 |
| EP | 0 590 883 B1 | 11/1996 |
| EP | 0 506 332 B1 | 12/1996 |
| EP | 0 751 663 A2 | 1/1997 |
| EP | 0 766 449 A2 | 4/1997 |
| EP | 0 751 474 A3 | 5/1997 |
| EP | 0 789 270 A1 | 8/1997 |
| EP | 0789480 A2 | 8/1997 |
| EP | 0 731 961 B1 | 5/1998 |
| EP | 0 612 042 B1 | 6/1998 |
| EP | 0 522 769 B1 | 9/1998 |
| EP | 0 691 632 B1 | 10/1998 |
| EP | 0 800 123 A3 | 11/1998 |
| EP | 0 617 545 B1 | 1/1999 |
| EP | 0 891 070 A1 | 1/1999 |
| EP | 0 733 958 B1 | 5/1999 |
| EP | 0 921 675 A2 | 6/1999 |
| EP | 0 932 115 A2 | 7/1999 |
| EP | 0 649 114 B1 | 2/2002 |
| GB | 2 346 110 A | 8/2000 |
| WO | WO91/19614 A1 | 12/1991 |
| WO | WO95/04665 A1 | 2/1995 |

| WO | WO95/10813 A1 | 4/1995 |
| --- | --- | --- |
| WO | WO95/14289 A2 | 5/1995 |
| WO | WO 95/26274 A1 | 10/1995 |
| WO | WO95/26274 A1 * | 10/1995 |
| WO | WO96/16381 A1 | 5/1996 |
| WO | WO96/31049 A1 | 10/1996 |
| WO | WO96/36163 A2 | 11/1996 |
| WO | WO97/00578 A1 | 1/1997 |
| WO | WO97/43736 A1 | 11/1997 |
| WO | WO99/17486 A1 | 4/1999 |
| WO | WO99/35819 A1 | 7/1999 |
| WO | WO99/36876 A2 | 7/1999 |

OTHER PUBLICATIONS

Maxemchuck, "Electronic Document Distribution," AT&T Tech. J., Sep. 1994, pp. 73-80.*

Brassil et al., "Marking Text Features of Document Images to Deter Illicit Dissemination," IEEE Proc. Int. Conf. on Pattern Recognition, vol. 2, Oct. 1994, pp. 315-319.*

Low et al.,"Document Marking and Identification using Both Line and Word Shifting," IEEE Proc. INFOCOM'95, Apr. 1995, pp. 853-860.*

Gruhl et al., "Information Hiding to Foil the Casual Conterfeiter," Proc. 2nd Int'l Workshop on Information Hiding, Apr. 14-17, 1998, pp. 1-15.*

Brassil et al, "Hiding Information in Document Images," Conf. on Information Sciences and Systems, Mar. 1995, pp. 482-489.*

U.S. Appl. No. 09/465,481, filed Dec. 16, 1999, Deuck et al.

U.S. Appl. No. 09/765,102, filed Jan. 17, 2001, Shaw.

Bender et al., "Techniques for Data Hiding," SPIE vol. 2420, Jan. 1995, pp. 164-173.

Brassil et al., "Electronic Marking and Identification Techniques to Discourage Document Copying," IEEE Proc. INFOCOM'94, Jun. 1994, pp. 1278-1287.

Brassil et al., "Marking Text Features of Document Images to Deter Illicit Dissemination," IEEE Proc. Int. Conf. on Pattern Recognition, vol. 2, Oct. 1994, pp. 315-319.

Brassil et al., "Hiding Information in Document Images," Mar. 1995, pp. 482-489, Cont. on Information Sciences and Systems.

Dauatzenberg, "Watermarking Images," Department of Microelectronics and Electrical Engineering, Trinity College Dublin, 47 pages, Oct. 1994.

Gale, "Zero-order Grating Microstructures," Optical Document Security, R.L. van Renesse, ed., Artech House, 1994, pp. 187-205.

Gonzalez et al, Digital image processing, Addison-Wesley publishing company. pp. 663-681, Sep. 1993.

Gruhl et al., "Information Hiding to Foil the Casual Counterfeiter," Proc. 2nd Int'l Workshop on Information Hiding, Apr. 14-17, 1998, pp. 1-15.

Haslop, "Security Printing Techniques," Optical Document Security, edited by R.L. van Renesse, Artech House, 1994, pp. 111-126.

Low et al., "Performance Comparison of two Text Marking methods," IEEE Journal on Selected Areas in Communications, vol. 16, No. 4, pp. 561-572, May, 1998.

Matsui et al., "Embedding a Watermark to Binary Pictures in Hardcopy System," Memoirs of the National Defense Academy, Japan, vol. 36, No. 2, (1997), pp. 13-20.

Matsui et al., "Video-Steganography: How to Secretly Embed a Signature in a Picture," IMA Intellectual Property Project Proceedings, vol. 1, issue 1, pp. 187-204, Jan. 1994.

Matsui et al., "Use of the Wavelet Transformation to Embed Signatures in Images," Systems and Computers in Japan, Jan. 1997, vol. 28, No. 1, pp. 87-94.

Maxemchuk, "Electronic Document Distribution," AT&T Tech. J., Sep. 1994, pp. 73-80.

Nakamura et al., "A Unified Coding Method of Image and Text Data Using Discrete Orthogonal Transform," Systems and Computers in Japan, vol. 21, No. 3, 1990, pp. 87-92.

Nakamura et al., "A Unified Coding Method of Dithered Image and Text Data Using Micropatterns," Electronics and Communications in Japan, Part 1, vol. 72, No. 4, 1989, pp. 50-56.

O'Ruanaidh et al., "Rotation, Scale and Translation Invariant Digital Image Watermarking," IEEE Proc. Int. Conf. on Image Processing, Oct. 26-29, 1997, pp. 536-539.

Spannenburg, "Modulation of Printed Gratings as a Protection Against Copying," in Optical Document Security, edited by R.L. van Renesse, Artech House, 1994, pp. 127-148.

Szepanski, "A Signal Theoretic Method for Creating Forgery-Proof Documents for Automatic Verification," Proceedings 1979 Carnahan Conference on Crime Countermeasures, May 16, 1979, pp. 101-109.

Tanaka et al., "Embedding Secret Information Into a Dithered Multi-Level Image," Proc. IEEE, Sep. 1990, pp. 216-220.

Tanaka et al., "New Integrated Coding Schemes for Computer-Aided Facsimile," Proc. IEEE Int'l Conf. on Sys. Integration, Apr. 1990, pp. 275-281.

Tanaka et al., "Embedding the Attribute Information Into a Dithered Image," Systems and Computers in Japan, vol. 21, No. 7, 1990, pp. 43-50.

Tanaka et al., "A Visual Retrieval System with Private Information for Image Database," Proceeding International Conference on DSP Applications and Technology, Oct. 1991, pp. 415-421.

Tirkel et al., "Electronic Water Mark," DICTA-93, Macquarie University, Sydney, Australia, Dec. 1993, pp. 666-672.

* cited by examiner

| 204 | 211 | 212 | 214 | 213 | 207 | 215 | 214 |
|-----|-----|-----|-----|-----|-----|-----|-----|
| 204 | 215 | 202 | 205 | 209 | 205 | 213 | 202 |
| 212 | 207 | 203 | 214 | 203 | 206 | 202 | 215 |
| 209 | 201 | 211 | 201 | 212 | 204 | 200 | 203 |
| 208 | 204 | 212 | 206 | 207 | 203 | 205 | 202 |
| 209 | 214 | 207 | 207 | 211 | 201 | 206 | 213 |
| 208 | 212 | 206 | 211 | 213 | 208 | 206 | 213 |
| 209 | 208 | 202 | 202 | 205 | 205 | 205 | 211 |

REFERENCE GREY-SCALE CALIBRATION TILE

SECURE DOCUMENT DESIGN CARRYING AUXILIARY MACHINE READABLE INFORMATION

RELATED APPLICATION DATA

This application is a continuation in part of application Ser. No. 09/939,298, filed Aug. 24, 2001 (now U.S. Pat. No. 6,804,379), which is a continuation of application Ser. No. 09/127,502, filed Jul. 31, 1998 (now U.S. Pat. No. 6,345,104), and which claims the benefit of provisional application 60/082,228, filed Apr. 16, 1998 (the specification of which is attached as Appendix A).

This application is also a continuation in part of Ser. No. 09/553,112, filed Apr. 20, 2000 (now abandoned), which claims priority to provisional application 60/131,005, filed Apr. 22, 1999, which are hereby incorporated by reference.

This application is also a continuation in part of Ser. No. 10/165,751, filed Jun. 6, 2002 (now U.S. Pat. No. 6,754,377), which is continuation of Ser. No. 09/074,034, filed May 6, 1998 (now U.S. Pat. No. 6,449,377), which is a continuation-in-part of application Ser. No. 08/438,159 (now U.S. Pat. No. 5,850,481), filed May 8, 1995, and also claims priority to provisional application 60/082,228, filed Apr. 16, 1998.

The subject matter of this application is also related to that of the present assignee's other issued patents (U.S. Pat. Nos. 5,636,292, 5,710,834, 5,721,788, 5,748,763, 5,748,783, 5,768,426, 5,850,481, 5,841,978, 5,832,119, 5,822,436, 5,841,886, 5,809,160, 6,122,403 and 6,026,193).

FIELD OF THE INVENTION

The invention relates to methods and systems for carrying auxiliary data in graphical structures on printed documents.

BACKGROUND AND SUMMARY OF THE INVENTION

Digital watermarking (sometimes termed "data hiding" or "data embedding") is a growing field of endeavor, with several different approaches. The present assignee's work is reflected in the patents and applications detailed above, together with laid-open PCT application WO97/43736. Other work is illustrated by U.S. Pat. Nos. 5,734,752, 5,646,997, 5,659,726, 5,664,018, 5,671,277, 5,687,191, 5,687,236, 5,689,587, 5,568,570, 5,572,247, 5,574,962, 5,579,124, 5,581,500, 5,613,004, 5,629,770, 5,461,426, 5,743,631, 5,488,664, 5,530,759, 5,539,735, 4,943,973, 5,337,361, 5,404,160, 5,404,377, 5,315,098, 5,319,735, 5,337,362, 4,972,471, 5,161,210, 5,243,423, 5,091,966, 5,113,437, 4,939,515, 5,374,976, 4,855,827, 4,876,617, 4,939,515, 4,963,998, 4,969,041, and published foreign applications WO 98/02864, EP 822,550, WO 97/39410, WO 96/36163, GB 2,196,167, EP 777,197, EP 736,860, EP 705,025, EP 766,468, EP 782,322, WO 95/20291, WO 96/26494, WO 96/36935, WO 96/42151, WO 97/22206, WO 97/26733. Some of the foregoing patents relate to visible watermarking techniques. Other visible watermarking techniques (e.g. data glyphs) are described in U.S. Pat. Nos. 5,706,364, 5,689,620, 5,684,885, 5,680,223, 5,668, 636, 5,640,647, 5,594,809.

Much of the work in data embedding is not in the patent literature but rather is published in technical articles. In addition to the patentees of the foregoing patents, some of the other workers in this field (whose watermark-related writings can by found by an author search in the INSPEC or NEXIS databases, among others) include I. Pitas, Eckhard Koch, Jian Zhao, Norishige Morimoto, Laurence Boney, Kineo Matsui, A. Z. Tirkel, Fred Mintzer, B. Macq, Ahmed H. Tewfik, Frederic Jordan, Naohisa Komatsu, Joseph O'Ruanaidh, Neil Johnson, Ingemar Cox, Minerva Yeung, and Lawrence O'Gorman.

The artisan is assumed to be familiar with the foregoing prior art.

In the following disclosure it should be understood that references to watermarking encompass not only the assignee's watermarking technology, but can likewise be practiced with any other watermarking technology, such as those indicated above.

Digital watermarking can be applied to myriad forms of information. This disclosure focuses on its applications to security documents. However, it should be recognized that the principles discussed below can also be applied outside this area.

Most of the prior art in image watermarking has focused on pixelated imagery (e.g., bitmapped images, JPEG/MPEG imagery, VGA/SVGA display devices, etc.). In most watermarking techniques, the luminance or color values of component pixels are slightly changed to effect subliminal encoding of binary data through the image. (This encoding can be done directly in the pixel domain, or after the signal has been processed and represented differently—e.g., as DCT or wavelet coefficients, or as compressed data, etc.)

While pixelated imagery is a relatively recent development, security documents—commonly employing line art—go back centuries. One familiar example is U.S. paper currency. On the one dollar banknote, for example, line art is used in several different ways. One is to form intricate webbing patterns (sometimes termed "guilloche patterns") around the margin of the note (generally comprised of light lines on dark background). Another is to form gray scale imagery, such as the portrait of George Washington (generally comprised of dark lines on a light background).

There are two basic ways to simulate grey-scales in security document line art. One is to change the relative spacings of the lines to effect a lightening or darkening of an image region. FIG. 1A shows such an arrangement; area B looks darker than area A due to the closer spacings of the component lines. The other technique is to change the widths of the component lines—wider lines resulting in darker areas and narrower lines resulting in lighter areas. FIG. 1B shows such an arrangement. Again, area B looks darker than area A, this time due to the greater widths of the component lines. These techniques are often used together. Ultimately, a given region simply has more or less ink.

In my application Ser. No. 08/438,159 I introduced, and in my application Ser. No. 09/074,034 I elaborated on, techniques for watermarking line art by making slight changes to the widths, or positions, of the component lines. Such techniques are further expanded in the present disclosure.

In several of my cited applications, I discussed various "calibration signals" that can be used to facilitate the decoding of watermark data despite corruption of the encoded image, such as by scaling or rotation. Common counterfeiting techniques—e.g., color photocopying, or scanning/inkjet printing—often introduce such corruption, whether deliberately or accidentally. Accordingly, it is important that watermarks embedded in security documents be detectable notwithstanding such effects. Calibration signals particularly suited for use with security documents are detailed in this disclosure.

In some embodiments, security documents are encoded to convey machine-readable multi-bit binary information (e.g., digital watermarks), usually in a manner not alerting human viewers that such information is present. The documents can be provided with overt or subliminal calibration patterns. When a document incorporating such a pattern is scanned (e.g., by a photocopier), the pattern facilitates detection of the encoded information notwithstanding possible scaling or rotation of the scan data. The calibration pattern can serve as a carrier for the watermark information, or the watermark can be encoded independently. In one embodiment, the watermark and the calibration pattern are formed on the document by an intaglio process, with or without ink. A photocopier responsive to such markings can take predetermined action if reproduction of a security document is attempted. A passport processing station responsive to such markings can use the decoded binary data to access a database having information concerning the passport holder. Some such apparatuses detect both the watermark data and the presence of a visible structure characteristic of a security document (e.g., the seal of the issuing central bank).

One aspect of the invention is a method of generating a machine readable code for a printed document. The method generates a variable auxiliary message comprising message values and maps the message values to a two dimensional pattern of areas on the document. The areas each comprise an arrangement of pixels on the printed document. Depending on a value of the message mapped to a corresponding area, the method assigns a visible structure to the corresponding area. Different visible structures are assignable to a single value of the message to create a visible design having a desired aesthetic appearance.

The foregoing and other features and advantages of the present technology will be more readily apparent from the following detailed description, which proceeds with reference to the accompanying drawings.

DETAILED DESCRIPTION

By way of introduction, this specification begins with review of techniques for embedding watermark data in line art, as disclosed in my application Ser. No. 09/074,034.

Figure 1A:
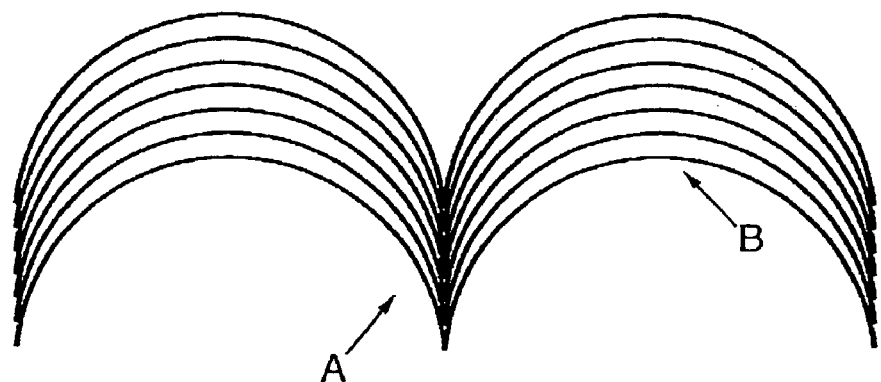
FIGS. 1A and 1B show prior art techniques for achieving grey-scale effects using line art.
Figure 1B:
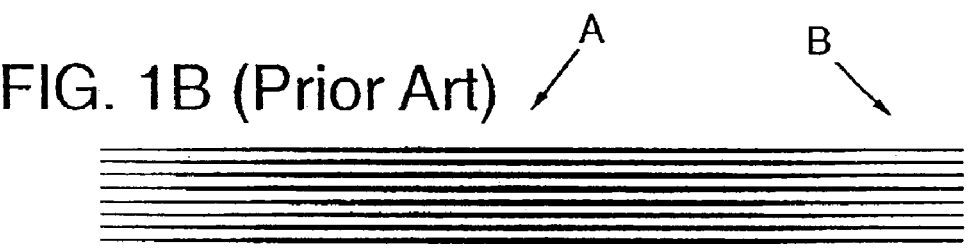
Figure 2:
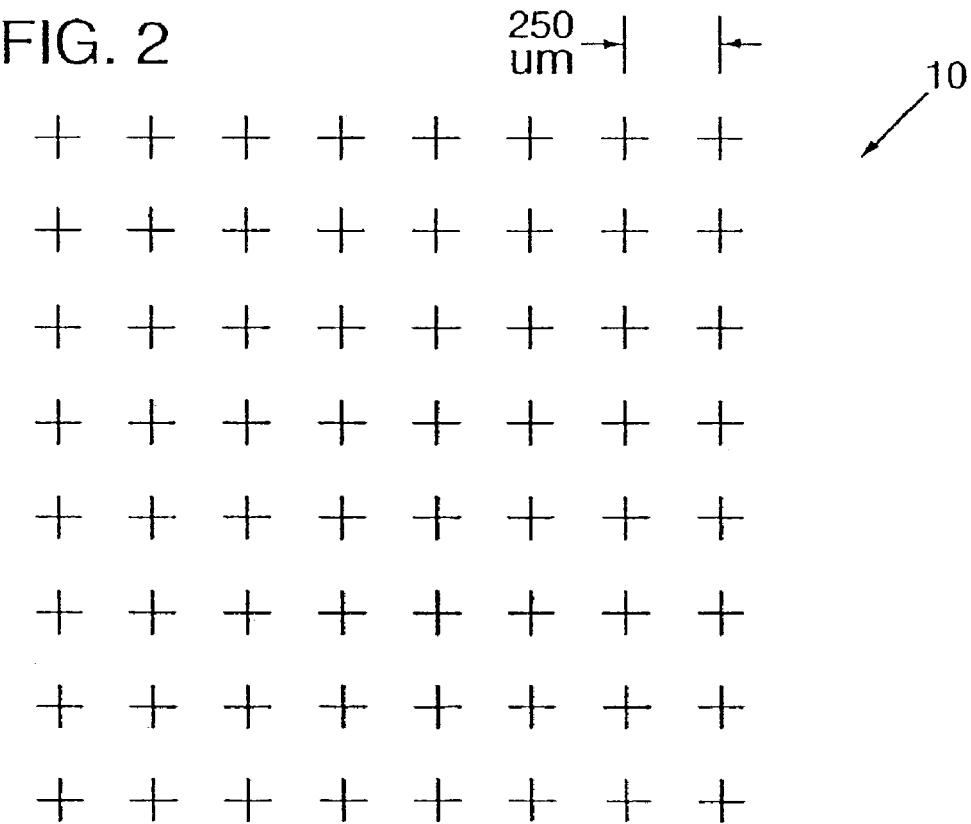
FIG. 2 shows a virtual array of grid points that can be imposed on a security document image according to an embodiment.

Referring to FIG. 2, the earlier-described technique employs a grid 10 of imaginary reference points arrayed over a line art image. The spacing between points is 250 microns in the illustrated arrangement, but greater or lesser spacings can of course be used.

Figure 3:
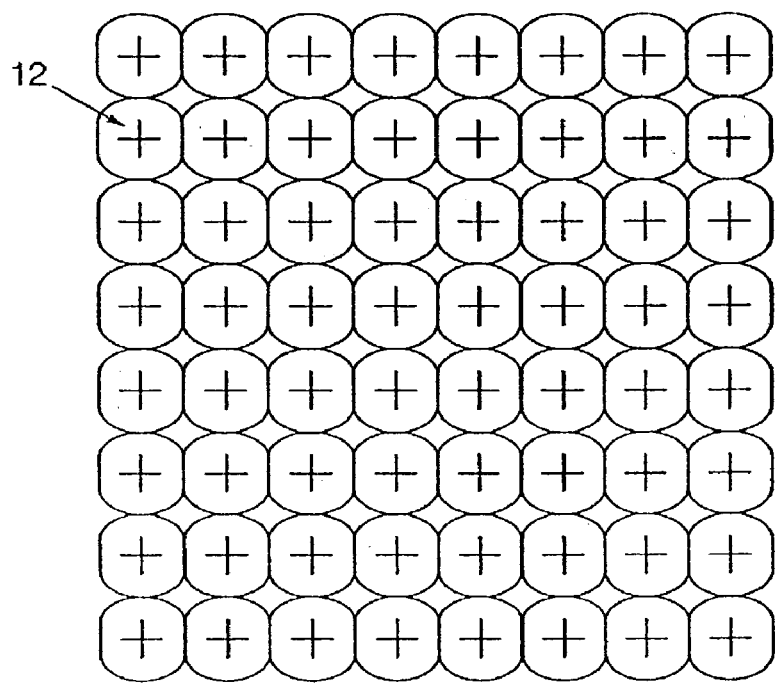
FIG. 3 shows a virtual array of regions that can be imposed on a security document image according to the FIG. 2 embodiment.

Associated with each grid point is a surrounding region 12, shown in FIG. 3. As described below, the luminosity (or reflectance) of each of these regions 12 is slightly changed to effect subliminal encoding of binary data.

Region 12 can take various shapes; the illustrated rounded-rectangular shape is representative only. (The illustrated shape has the advantage of encompassing a fairly large area while introducing fewer visual artifacts than, e.g., square regions.) In other embodiments, squares, rectangles, circles, ellipses, etc., can alternatively be employed.

Figure 4:
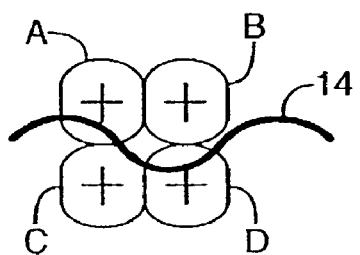
FIG. 4 shows an excerpt of FIG. 3 with a line from a line art image passing therethrough.

FIG. 4 is a magnified view of an excerpt of FIG. 3, showing a line 14 passing through the grid of points. The width of the line, of course, depends on the particular image of which it is a part. The illustrated line is about 40 microns in width; greater or lesser widths can naturally be used.

Figure 5:
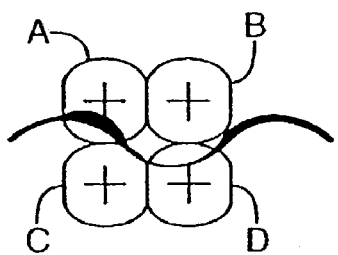
FIG. 5 shows changes to the width of the line of FIG. 3 to effect watermark encoding.

In one encoding technique, shown in FIG. 5, the width of the line is controllably varied so as to change the luminosity of the regions through which it passes. To increase the luminosity (or reflectance), the line is made narrower (i.e. less ink in the region). To decrease the luminosity, the line is made wider (i.e. more ink).

Whether the luminance in a given region should be increased or decreased depends on the particular watermarking algorithm used. Any algorithm can be used, by changing the luminosity of regions 12 as the algorithm would otherwise change the luminance or colors of pixels in a pixelated image. (Some watermarking algorithms effect their changes in a transformed domain, such as DCT, wavelet, or Fourier. However, such changes are ultimately manifested as changes in luminance or color.)

In an exemplary algorithm, the binary data is represented as a sequence of −1s and 1s, instead of 0s and 1s. (The binary data can comprise a single datum, but more typically comprises several. In an illustrative embodiment, the data comprises 128 bits, some of which are error-correcting or -detecting bits.)

Each element of the binary data sequence is then multiplied by a corresponding element of a pseudo-random number sequence, comprised of −1s and 1s, to yield an intermediate data signal. Each element of this intermediate data signal is mapped to a corresponding sub-part of the image, such as a region 12. (Commonly, each element is mapped to several such sub-parts.) The image in (and optionally around) this region is analyzed to determine its relative capability to conceal embedded data, and a corresponding scale factor is produced. Exemplary scale factors may range from 0 to 3. The scale factor for the region is then multiplied by the element of the intermediate data signal mapped to the region in order to yield a "tweak" or "bias" value for the region. In the illustrated case, the resulting tweaks can range from −3 to 3. The luminosity of the region is then adjusted in accordance with the tweak value. A tweak value of −3 may correspond to a −5% change in luminosity; −2 may correspond to −2% change; −1 may correspond to −1% change; 0 may correspond to no change; 1 may correspond to +1% change; 2 may correspond to +2% change, and 3 may correspond to +5% change. (This example follows the basic techniques described in the Real Time Encoder embodiment disclosed in U.S. Pat. No. 5,710,834.)

In FIG. 5, the watermarking algorithm determined that the luminance of region A should be reduced by a certain percentage, while the luminance of regions C and D should be increased by certain percentages.

In region A, the luminance is reduced by increasing the line width. In region D, the luminance is increased by reducing the line width; similarly in region C (but to a lesser extent).

No line passes through region B, so there is no opportunity to change the region's luminance. This is not fatal to the method, however, since the exemplary watermarking algorithm redundantly encodes each bit of data in sub-parts spaced throughout the line art image.

The changes to line widths in regions A and D of FIG. 5 are exaggerated for purposes of illustration. While the illustrated variance is possible, most implementations will typically modulate the line width 3-50% (increase or decrease).

(Many watermarking algorithms routinely operate within a signal margin of about +/−1% changes in luminosity to effect encoding. That is, the "noise" added by the encoding amounts to just 1% or so of the underlying signal. Lines typically don't occupy the full area of a region, so a 10% change to line width may only effect a 1% change to region luminosity, etc. Security documents are different from photographs in that the artwork generally need not convey photorealism. Thus, security documents can be encoded with higher energy than is used in watermarking photographs, provided the result is still aesthetically satisfactory. To illustrate, localized luminance changes on the order of 10% are possible in security documents, while such a level of watermark energy in photographs would generally be considered unacceptable. In some contexts, localized luminance changes of 20, 30, 50 or even 100% are acceptable.)

In the illustrated technique, the change to line width is a function solely of the watermark tweak (or watermark/calibration pattern tweak, as discussed below) to be applied to a single region. Thus, if a line passes through any part of a region to which a tweak of 2% is to be applied, the line width in that region is changed to effect the 2% luminance difference. In variant techniques, the change in line width is a function of the line's position in the region. In particular, the change in line width is a function of the distance between the region's center grid point and the line's closest approach to that point. If the line passes through the grid point, the full 2% change is effected. At successively greater distances, successively smaller changes are applied. The manner in which the magnitude of the tweak changes as a function of line position within the region can be determined by applying one of various interpolation algorithms, such as the bi-linear, bi-cubic, cubic splines, custom curve, etc.

In other variant techniques, the change in line width in a given region is a weighted function of the tweaks for adjoining or surrounding regions. Thus, the line width in one region may be increased or decreased in accordance with a tweak value corresponding to one or more adjoining regions.

Combinations of the foregoing techniques can also be employed.

In the foregoing techniques, it is sometimes necessary to trade-off the tweak values of adjoining regions. For example, a line may pass along a border between regions, or pass through the point equidistant from four grid points ("equidistant zones"). In such cases, the line may be subject to conflicting tweak values—one region may want to increase the line width, while another may want to decrease the line width. (Or both may want to increase the line width, but differing amounts.) Similarly in cases where the line does not pass through an equidistant zone, but the change in line width is a function of a neighborhood of regions whose tweaks are of different values. Again, known interpolation functions can be employed to determine the weight to be given the tweak from each region in determining what change is to be made to the line width in any given region.

In the exemplary watermarking algorithm, the average change in luminosity across the security document image is zero, so no generalized lightening or darkening of the image is apparent. The localized changes in luminosity are so minute in magnitude, and localized in position, that they are essentially invisible (e.g. inconspicuous/subliminal) to human viewers.

Figure 6:
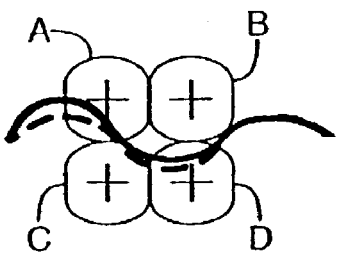
FIG. 6 shows changes to the position of the line of FIG. 3 to effect watermark encoding.

An alternative technique is shown in FIG. 6, in which line position is changed rather than line width.

In FIG. 6 the original position of the line is shown in dashed form, and the changed position of the line is shown in solid form. To decrease a region's luminosity, the line is moved slightly closer to the center of the grid point; to increase a region's luminosity, the line is moved slightly away. Thus, in region A, the line is moved towards the center grid point, while in region D it is moved away.

It will be noted that the line on the left edge of region A does not return to its nominal (dashed) position as it exits the region. This is because the region to the left of region A also is to have decreased luminosity. Where possible, it is generally preferable not to return a line to its nominal position, but instead to permit shifted lines to remain shifted as they enter adjoining regions. So doing permits a greater net line movement within a region, increasing the embedded signal level.

Again, the line shifts in FIG. 6 are somewhat exaggerated. More typical line shifts are on the order of 3-50 microns.

One way to think of the FIG. 6 technique is to employ a magnetism analogy. The grid point in the center of each region can be thought of as a magnet. It either attracts or repels lines. A tweak value of −3, for example, may correspond to a strong-valued attraction force; a tweak value of +2 may correspond to a middle-valued repulsion force, etc. In FIG. 6, the grid point in region A exhibits an attraction force (i.e. a negative tweak value), and the grid point in region D exhibits a repulsion force (e.g. a positive tweak value).

The magnetic analogy is useful because the magnetic effect exerted on a line depends on the distance between the line and the grid point. Thus, a line passing near a grid point is shifted more in position than a line near the periphery of the region.

(Actually, the magnetism analogy can serve as more than a conceptual tool. Instead, magnetic effects can be modeled in a computer program and serve to synthesize a desired placement of the lines relative to the grid points. Arbitrarily customized magnetic fields can be used.)

Each of the variants applicable to FIG. 5 is likewise applicable to FIG. 6.

Combinations of the embodiments of FIGS. 5 and 6 can of course be used, resulting in increased watermark energy, better signal-to-noise ratio and, in many cases, less noticeable changes.

In still a further technique, the luminance in each region is changed while leaving the line unchanged. This can be effected by sprinkling tiny dots of ink in the otherwise-vacant parts of the region. In high quality printing, of the type used with security documents, droplets on the order of 3 microns in diameter can be deposited. (Still larger droplets are still beyond the perception threshold for most viewers.) Speckling a region with such droplets (either in a regular array, or random, or according to a desired profile such as Gaussian), can readily effect a 1% or so change in luminosity. (Usually dark droplets are added to a region, effecting a decrease in luminosity. Increases in luminosity can be effected by speckling with a light colored ink, or by forming light voids in line art otherwise present in a region.) (Actually, production realities often mean that many such microdots will not print, but statistically some will.)

In a variant of the speckling technique, very thin mesh lines can be inserted in the artwork—again to slightly change the luminance of one or more regions (so-called "background tinting").

The following portion of the specification reviews a calibration, or synchronization pattern used in an illustrative security document to facilitate proper registration of the watermark data for decoding. It may be helpful to begin by reviewing further details about the illustrative watermarking method.

Figure 7A:
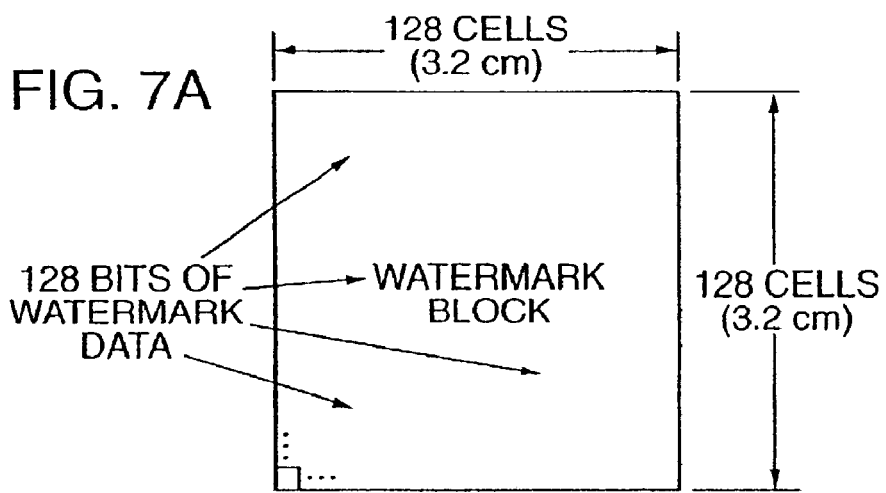
FIGS. 7A and 7B show aspects of watermark and calibration blocks.

Referring to FIG. 7A, an exemplary watermark is divided into "cells" that are 250 microns on a side, each conveying a single bit of information. The cells are grouped into a "block" having 128 cells on a side (i.e. 16,384 cells per block). The blocks are tiled across the region being watermarked (e.g. across the face of a security document).

As noted, the watermark payload consists of 128 bits of data. Each bit is represented by 128 different cells within each block. (The mapping of bits to cells can be pseudo-random, sequential, or otherwise.) The 128 "0"s and "1"s of the watermark data are randomized into substantially equal-probability "1"s and "−1"s by a pseudo-random function to reduce watermark visibility. Where a cell has a value of "1," the luminance of the corresponding area of the image is slightly increased; where a cell has a value of "−1," the luminance of the corresponding area of the image is slightly decreased (or vice versa). In some embodiments, the localized changes to image luminance due to the +1/−1 watermark cell values are scaled in accordance with data-hiding attributes of the local area (e.g. to a range of +/−4 digital numbers) to increase the robustness of the watermark without compromising its imperceptibility.

It should be noted that a single watermark "cell" commonly encompasses a large number of ink droplets. In high resolution printing, as is commonly used in security documents (e.g. 5000 microdroplets per inch), a single watermark cell may encompass a region of 50 droplets by 50 droplets. In other embodiments, a cell may encompass greater or lesser numbers of droplets.

Decoding a watermark requires precise re-registration of the scanned document image, so the watermark cells are located where expected. To facilitate such registration, a calibration signal can be employed.

An exemplary calibration signal is a geometrical pattern having a known Fourier-Mellin transform. As described in application Ser. No. 08/649,419, when a known pattern is transformed into the Fourier domain, and then further transformed into the Fourier-Mellin domain, the transformed data indicates the scale and rotation of the pattern. If this pattern is replicated on a security document that is thereafter scanned (as noted, scanning commonly introduces rotation, and sometimes scaling), the F-M transform data indicates the scale and rotation of the scanned data, facilitating virtual re-registration of the security document image for watermark detection.

Figure 7B:
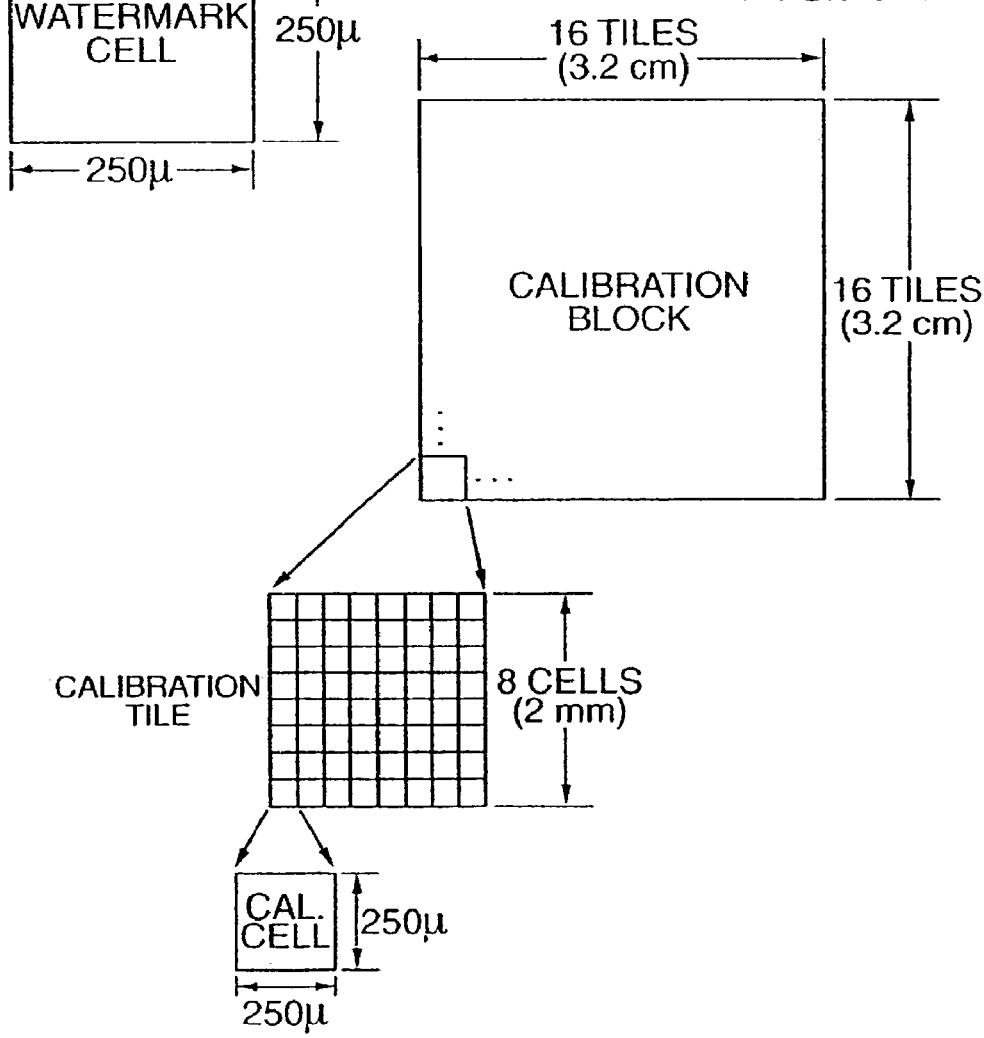

As shown in FIG. 7B, an illustrative geometrical calibration pattern is a block, 3.2 cm on a side. The block comprises a 16×16 array of substantially identical tiles, each 2 mm on a side. Each tile, in term, comprises an 8×8 array of component cells.

As described below, the geometrical calibration pattern in the illustrated embodiment is a visible design feature on the security document. Accordingly, unlike the watermark data, the calibration pattern does not have to be limited to a small range of digital numbers in order to keep it substantially hidden among other features of the document. Also unlike the watermark data, the illustrated calibration pattern is not locally scaled in accordance with data hiding attributes of the security document image.

It is possible to print rectangular grids of grey-scaled ink on a document to serve as a calibration pattern. However, aesthetic considerations usually discourage doing so. Preferable is to realize the calibration pattern in a more traditional art form, such as a seemingly random series of intertwining lines, forming a weave-like pattern that is printed across part or all of the document.

Figures 8, 12:
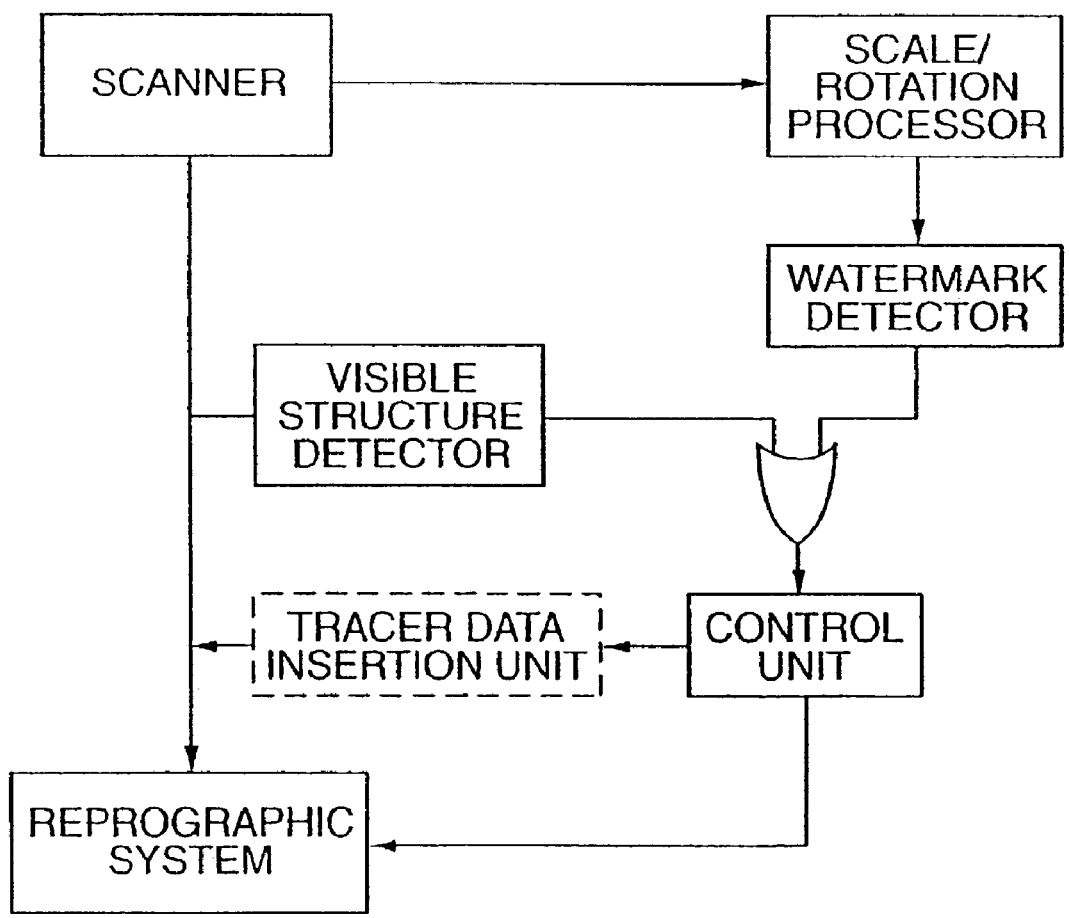
FIG. 8 shows an illustrative reference grey-scale calibration tile.
FIG. 12 is a block diagram of a photocopier.

To create this weave-like calibration pattern, a designer first defines an 8×8 cell reference calibration tile. Each cell in the tile is assigned a grey-scale value. In the illustrated embodiment, values within 2-10 percent of each other are used, although this is not essential. An exemplary reference calibration tile is shown in FIG. 8 (assuming 8-bit quantization).

The Fourier-Mellin transform of a block derived from this reference calibration tile will serve as the key by which the scale and rotation of a scanned security document image are determined.

There is some optimization that may be done in selecting/designing the pattern of grey-scale values that define the reference calibration tile. The pattern should have a F-M transform that is readily distinguished from those of other design and watermark elements on the security document. One design procedure effects a trial F-M transform of the rest of the security document design, and works backwards from this data to select a reference calibration tile that is readily distinguishable.

Once a reference tile pattern is selected, the next steps iteratively define a tile having a weave-like pattern whose local luminance values approximately match the reference tile's grey-scale pattern.

Figure 9A:
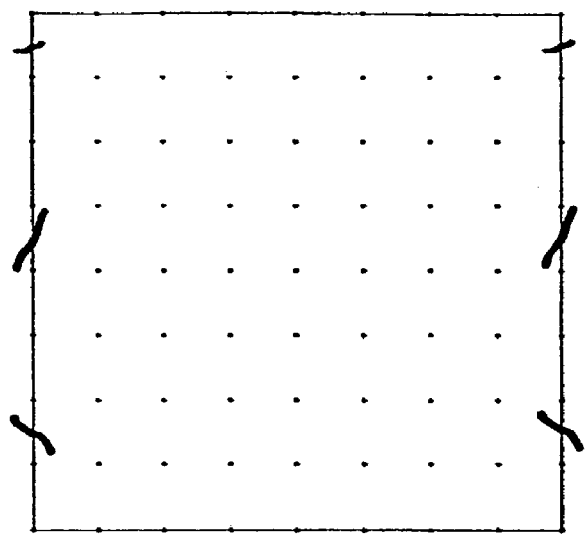
FIGS. 9A-9C show steps in the design of a weave calibration pattern.

Referring to FIG. 9A, the first such step is to select points on the bottom and left side edges of the tile where lines are to cross the tile boundaries. The angles at which the lines cross these boundaries are also selected. (In the illustrated embodiment, these points and angles are selected arbitrarily, although in other embodiments, the choices can be made in conformance with an optimizing design procedure.)

The selected points and angles are then replicated on the corresponding right and top edges of the tile. By this arrangement, lines exiting the top of one tile seamlessly enter the bottom of the adjoining tile at the same angle.

Likewise, lines exiting either side of a tile seamlessly join with lines in the laterally adjoining blocks.

Figure 9B:
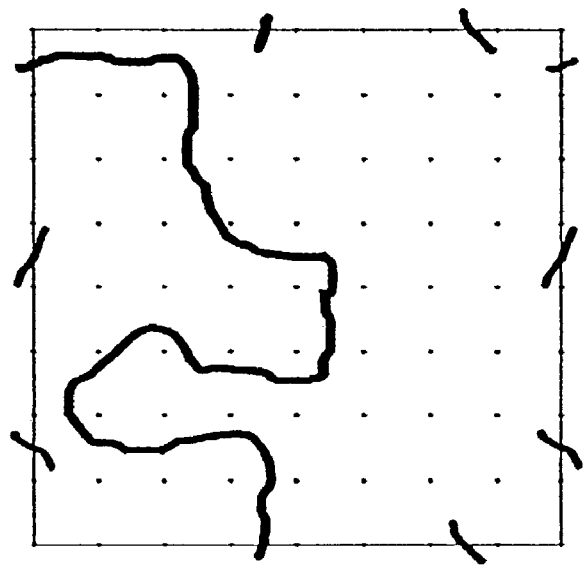
Figure 9C:
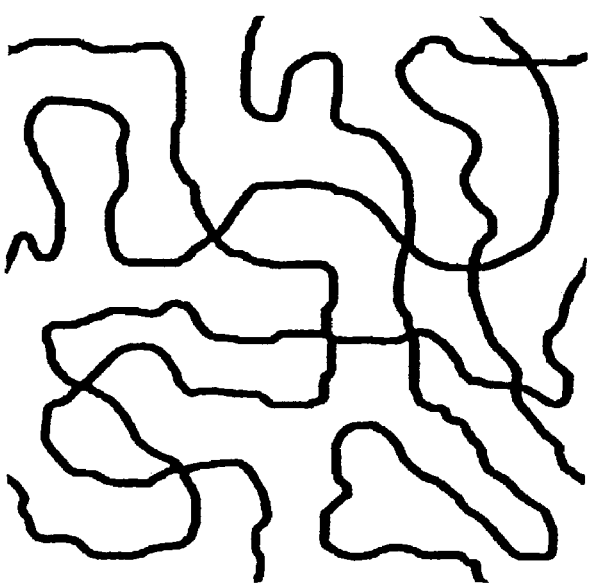

The designer next establishes trial line paths snaking through the tile (FIGS. 9B, 9C), linking arbitrarily matched pairs of points on the tile's edges. (These snaking paths are sometimes termed "worms.") Desirably, these paths pass through each of the 64 component cells forming the tile, with the total path length through each cell being within +/−30% of the average path length through all cells. (This trial routing can be performed with pencil and paper, but more commonly is done on a computer graphics station, with a mouse, light pen, or other input device being manipulated by the designer to establish the routing.) In the illustrated embodiment, the lines have a width of about 30-100 microns, and an average spacing between lines of about 100-400 microns, although these parameters are not critical.

Figure 10:
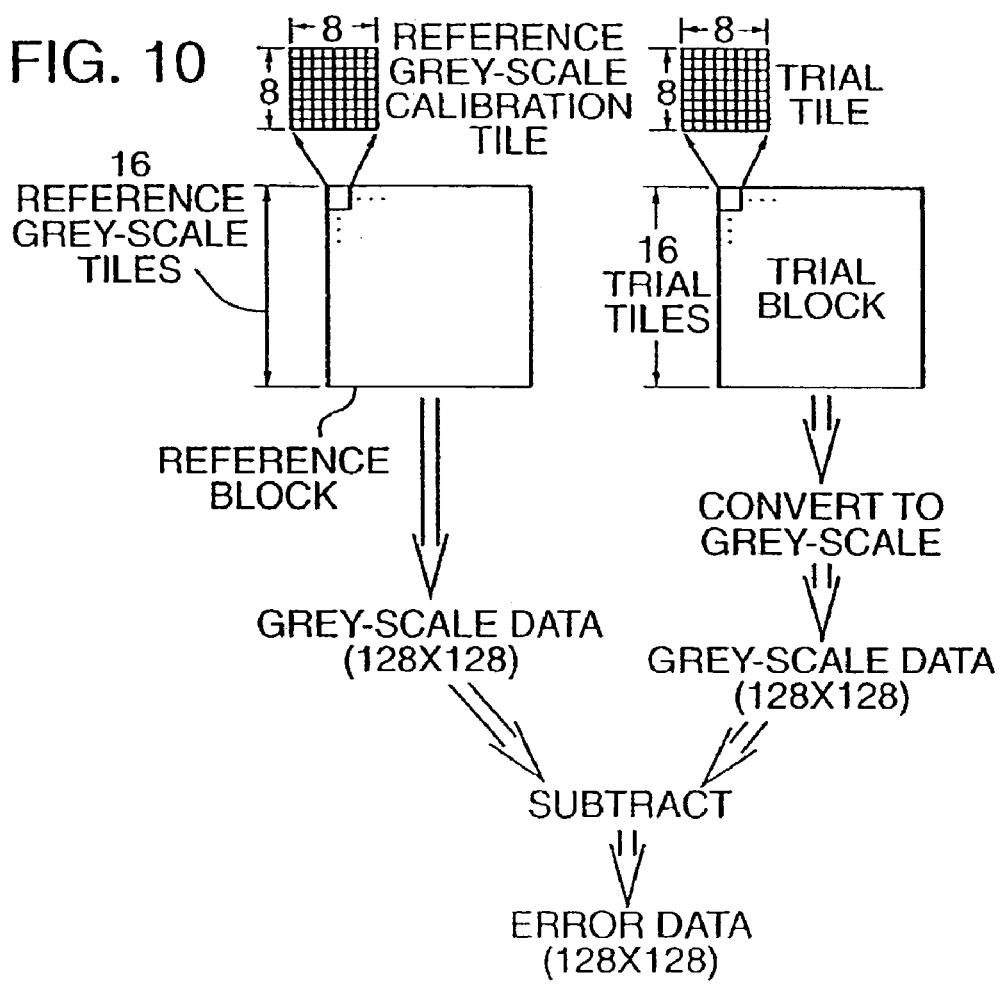
FIG. 10 shows the generation of error data used in designing a weave calibration pattern.

Turning next to FIG. 10, the trial tile is assembled with like tiles to form a 16×16 trial block (3.2 cm on a side), with a repetitive weave pattern formed by replication of the line pattern defined on the 8×8 cell trial tile. This trial block is then converted into grey-scale values. The conversion can be done by scanning a printed representation of the trial block, or by computer analysis of the line lengths and positions. The output is a 128×128 array of grey-scale values, each value corresponding to the luminance of a 250 micron cell within the trial block.

This grey-scale data is compared with grey-scale data provided by assembling 256 of the reference calibration tiles (each an 8×8 array of cells) into a 16×16 calibration pattern block. In particular, the grey-scale array resulting from the trial block is subtracted from the grey-scale array resulting from the reference block, generating a 128×128 array of error values. This error data is used to tweak the arrangement of lines in the trial block.

In cells of the trial calibration block where the error value is positive, the line is too long. That is, the pattern is too dark in those cells (i.e. it has a low luminance grey-scale value), due to a surplus of line length (i.e. too much ink). By shortening the line length in those cells, their luminance is increased (i.e. the cell is lightened). Shortening can be effected by straightening curved arcs, or by relocating a line's entrance and exit points in a cell so less distance is traversed through the cell.

Conversely, in cells where the error value is negative, the line is too short. By increasing the line length in such cells, their luminance is decreased (i.e. the cell is darkened). Increasing the line length through a cell can be accomplished by increasing the curvature of the line in the cell, or by relocating a line's entrance and exit points along the boundary of the cell, so more distance is traversed through the cell.

A computer program is desirably employed to effect the foregoing changes in line routing to achieve the desired darkening or lightening of each cell.

After line positions in the trial calibration block have been tweaked in this fashion, the trial block is again converted to grey-scale values, and again subtracted from the reference block. Again, an array of error values is produced. The positions of the lines are then further tweaked in accordance with the error values.

The foregoing steps of tweaking line routes in accordance with error signals, converting anew into grey-scale, and computing new error values, is repeated until the luminance of the resulting weave pattern in the trial block is arbitrarily close to the luminance of the reference block. Four of five iterations of this procedure commonly suffice to converge on a final calibration block.

(It will be noted that the initial tile pattern created by the designer is done at the tile level—8×8 cells. After the initial trial tile is created, subsequent processing proceeds at the block level (128×128 cells). A common result of the iterative design procedure is that the component tiles lose their uniformity. That is, the pattern of lines in a tile at a corner of the final calibration block will generally be slightly different than the pattern of lines in a tile near the center of the block.)

After the final calibration block pattern has been established as above, the blocks are tiled repetitively over some or all of the security document, and can serve either as a background design element, or as a more apparent element of the design. By printing this weave pattern in an ink color close to the paper substrate color, the patterning is highly unobtrusive. (If a highly contrasting ink color is used, and if the pattern extends over most or all of the security document, it may be desirable to employ a brighter luminance paper than otherwise, since the weave pattern effectively darkens the substrate.)

As noted in my application Ser. No. 08/649,419, the Fourier-Mellin transform has the property that the same output pattern is produced, regardless of rotation or scaling of the input image. The invariant output pattern is shifted in one dimension proportional to image rotation, and shifted in another dimension proportional to image scaling. When an image whose F-M transform is known, is thereafter rotated and/or scaled, the degree of rotation and scaling can be determined by observing the degree of shift of the transformed F-M pattern in the two dimensions. Once the rotation and scale are known, reciprocal processing of the image can be performed to restore the image to its original orientation and scale.

In the above-described embodiment, the calibration block pattern has a known F-M transform. When a security document incorporating such a pattern is scanned (e.g. by a photocopier, a flatbed scanner, a facsimile machine, etc.), the resulting data can be F-M transformed. The known F-M pattern is then identified in the transformed data, and its two-dimensional shift indicates the scale and rotation corruption of the scanned security document data. With these parameters known, misregistration of the security document—including scale and rotation corruption—can be backed-off, and the security document data restored to proper alignment and scale. In this re-registered state, the watermark can be detected. (In alternative embodiments, the original scan data is not processed to remove the scale/rotation effects. Instead, subsequent processing proceeds with the data in its corrupted state, and takes into account the specific corruption factor(s) to nonetheless yield accurate decoding, etc.)

The just-described calibration pattern and design procedure, of course, are just exemplary, and are subject to numerous modifications. The dimensions can be varied at will. It is not essential that the cell size of the calibration tiles match that of the watermark. Nor do the cells sizes need to be integrally related to each other. Nor does the calibration pattern need to be implemented as lines; other ink patterns can alternatively be used to approximate the grey-scale reference pattern There is no requirement that the lines snake continuously through the tiles. A line can connect to just a single edge point of a tile, resulting in a line that crosses that tile boundary, but no other. Or a line can both begin and end in a single tile, and not connect to any other.

While darker lines on a lighter background are illustrated, lighter lines on a darker background can alternatively be employed.

The iterative design procedure can employ the F-M transform (or other transform). For example, the trial block pattern can be transformed to the F-M domain, and there compared with the F-M transform of the reference block. An F-M domain error signal can thus be obtained, and the routing of the lines can be changed in accordance therewith.

Although the illustrated embodiment tweaked the cell-based grey-scales of the calibration block by changing line curvature and position, other luminance changing techniques can be employed. For example, the width of the weave lines can be locally changed, or small ink dots can be introduced into certain cell areas.

The foregoing (and following) discussions contemplate that the watermark and/or calibration pattern is printed at the same time as (indeed, sometimes as part of) the line art on the security document. In many applications it is desirable to provide the calibration pattern on the security document substrate prior to printing. The markings can be ink applied by the manufacturer, or can be embossings applied, e.g., by rollers in the paper-making process. (Such textural marking is discussed further below.) Or, the markings can be applied by the security document printer, as a preliminary printing operation, such as by offset printing. By using an ink color/density that is already closely matched to the underlying tint of the paper stock, the manufacturer of the paper can introduce less tinting during its manufacture. Such tinting will effectively be replaced by the preliminary printing of the watermark/calibration pattern on the blank paper.

Calibration signals entirely different than those detailed above can also be used. Calibration signals that are optimized to detect rotation, but not scaling, can be employed when scaling is not a serious concern. DCT and Fourier transforms provide data that is readily analyzed to determine rotation. A calibration signal can be tailored to stand out in a typically low-energy portion of the transformed spectrum (e.g. a series of fine lines at an inclined angle transforms to a usually vacant region in DCT space), and the scanned image can be transformed to the DCT/Fourier domains to examine any shift in the calibration signal (e.g. a shift in the spatial frequency representation of the inclined lines).

In some security documents, the just-described calibration weave is printed independently of the watermark encoding. In other embodiments, the weave serves as the lines whose widths, locations, etc., are modulated by the watermark data, as detailed herein and in application Ser. No. 09/074,034.

In an illustrative embodiment, the printing of the security document is achieved by intaglio printing. Intaglio is a well known printing process employing a metal plate into which the security document pattern is etched or engraved. Ink is applied to the plate, filling the etched recesses/grooves. Paper is then pressed into the plate at a very high pressure (e.g. 10-20 tons), both raised-inking and slightly deforming (texturing) the paper.

Although ink is commonly used in the intaglio process, it need not be in certain embodiments of the present invention. Instead, the paper texturing provided by the intaglio pressing—alone—can suffice to convey watermark data. (Texturing of a medium to convey watermark information is disclosed in various of my prior applications, including allowed application Ser. No. 08/438,159.)

To illustrate, an intaglio plate was engraved (using a numerically controlled engraving apparatus), to a depth of slightly less than 1 mm, in accordance with a 3.2×3.2 cm. noise-like block of watermark data. The watermark data was generated as described above (e.g. 128 bits of data, randomly distributed in a 128×128 cell array), and summed with a correspondingly-sized block of calibration data (implemented as discrete grey-scaled cells, rather than the line/weave pattern detailed above). In this embodiment, the data was not kept within a small range of digital numbers, but instead was railed to a full 8-bit dynamic range.)

This textured paper was placed—textured extrema down—on the platen of an conventional flatbed scanner (of the sort commonly sold as an accessory for personal computers), and scanned. The resulting image data was input to Adobe's Photoshop image processing software, version 4.0, which includes Digimarc watermark reader software. The software readily detected the watermark from the textured paper, even when the paper was skewed on the scanner platen.

The optical detection process by which a seemingly blank piece of paper can reliably convey 128 bits of data through an inexpensive scanner has not been analyzed in detail; the degree of localized reflection from the paper may be a function of whether the illuminated region is concave or convex in shape. Regardless of the explanation, it is a remarkable phenomenon to witness.

Experiments have also been conducted using traditional opaque inks. Again, the watermark can reliably be read.

In addition to the just-described technique for "reading" intaglio markings by a conventional scanner, a variant technique is disclosed in Van Renesse, Optical Inspection Techniques for Security Instrumentation, SPIE Proc. Vol. 2659, pp. 159-167 (1996), and can alternatively be used in embodiments according to the present invention.

Although intaglio is a preferred technique for printing security documents, it is not the only such technique. Other familiar techniques by which watermarks and calibration patterns can be printed include offset litho and letterpress, as well as inkjet printing, xerographic printing, etc. And, as noted, textured watermarking can be effected as part of the paper-making process, e.g. by high pressure textured rollers.

In still other embodiments, the watermark and/or calibration ("information") patterns are not printed on the security document substrate, but rather are formed on or in an auxiliary layer that is laminated with a base substrate. If a generally clear laminate is used, the information patterns can be realized with opaque inks, supplementing the design on the underlying substrate. Or the added information can be encoded in textural form. Combinations of the foregoing can similarly be used.

To retrofit existing security document designs with information patterns, the existing artwork must be modified to effect the necessary additions and/or tweaks to localized security document luminance and/or texture.

When designing new security documents, it would be advantageous to facilitate integration of information patterns into the basic design. One such arrangement is detailed in the following discussion.

Many security documents are still designed largely by hand. A designer works at a drafting table or computer workstation, and spends many hours laying-out minute (e.g. 5 mm×5 mm) excerpts of the design. To aid integration of watermark and/or calibration pattern data in this process, an accessory layout grid can be provided, identifying the watermark "bias" (e.g. −3 to +3) that is to be included in each 250 micron cell of the security document. If the accessory grid indicates that the luminance should be slightly increased in a cell (e.g. 1%), the designer can take this bias in mind when defining the composition of the cell and include a touch less ink than might otherwise be included. Similarly, if the accessory grid indicates that the luminance should be somewhat strongly increased in a cell (e.g. 5%), the designer can again bear this in mind and try to include more ink than might otherwise be included. Due to the substantial redundancy of most watermark encoding techniques, strict compliance by the designer to these guidelines is not required. Even loose compliance can result in artwork that requires little, if any, further modification to reliably convey watermark and/or calibration information.

Such "designing-in" of embedded information in security documents is facilitated by the number of arbitrary design choices made by security document designers. A few examples from U.S. banknotes include the curls in the presidents' hair, the drape of clothing, the clouds in the skies, the shrubbery in the landscaping, the bricks in the pyramid, the fill patterns in the lettering, and the great number of arbitrary guilloche patterns and other fanciful designs, etc. All include curves, folds, wrinkles, shadow effects, etc., about which the designer has wide discretion in selecting local luminance, etc. Instead of making such choices arbitrarily, the designer can make these choices deliberately so as to serve an informational—as well as an aesthetic—function.

To further aid the security document designer, data defining several different information-carrying patterns (both watermark and/or calibration pattern) can be stored on mass storage of a computer workstation and serve as a library of design elements for future designs. The same user-interface techniques that are employed to pick colors in image-editing software (e.g. Adobe Photoshop) and fill textures in presentation programs (e.g. Microsoft PowerPoint) can similarly be used to present a palette of information patterns to a security document designer. Clicking on a visual representation of the desired pattern makes the pattern available for inclusion in a security document being designed (e.g. filling a desired area).

In the embodiment earlier-described, the calibration pattern is printed as a visible artistic element of the security document. However, the same calibration effect can be provided subliminally if desired. That is, instead of generating artwork mimicking the grey-scale pattern of the reference calibration block, the reference calibration block can itself be encoded into the security document as small changes in local luminance. In many such embodiments, the bias to localized document luminance due to the calibration pattern is simply added to the bias due to the watermark data, and encoded like the watermark data (e.g. as localized changes to the width or position of component line-art lines, as inserted ink droplets, etc.).

The uses to which the 128 bits of watermark data can be put in security documents are myriad. Many are detailed in the materials cited above. Examples include postal stamps encoded with their value, or with the zip code of the destination to which they are addressed (or from which they were sent); banknotes encoded with their denomination, and their date and place of issuance; identification documents encoded with authentication information by which a person's identify can be verified; etc., etc.

The encoded data can be in a raw form—available to any reader having the requisite key data (in watermarking techniques where a key data is used), or can be encrypted, such as with public key encryption techniques, etc. The encoded data can embody information directly, or can be a pointer or an index to a further collection of data in which the ultimate information desired is stored.

Figure 11:
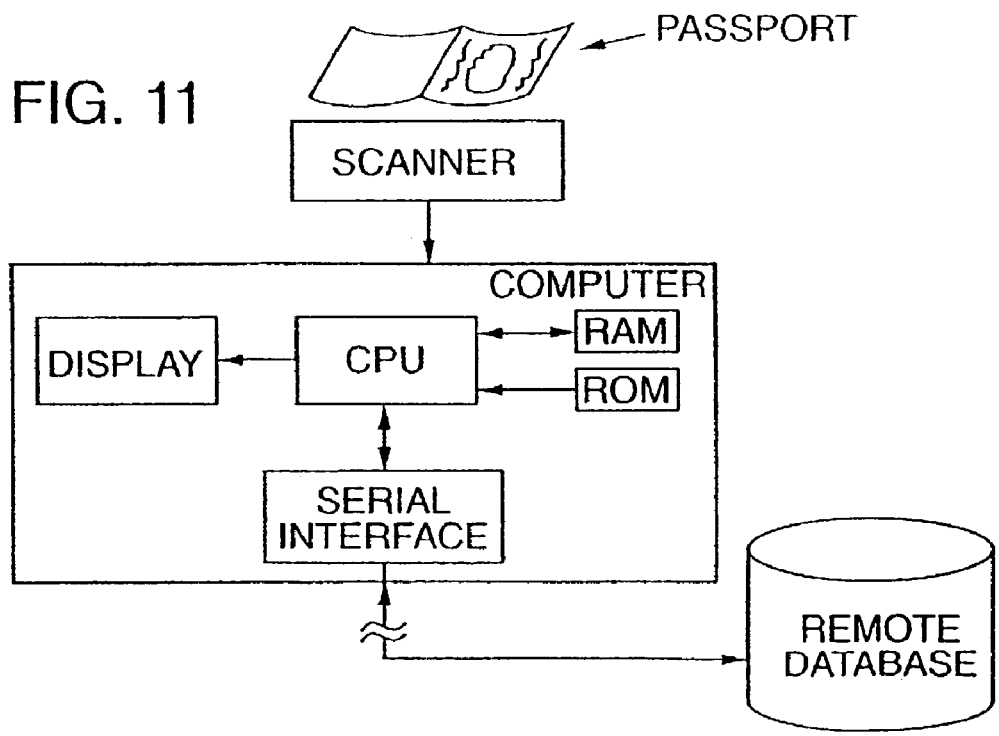
FIG. 11 is a block diagram of a passport processing station.

For example, watermark data in a passport need not encode a complete dossier of information on the passport owner. Instead, the encoded data can include key data (e.g. a social security number) identifying a particular record in a remote database in which biographical data pertaining to the passport owner is stored. A passport processing station employing such an arrangement is shown in FIG. 11.

To decode watermark data, the security document must be converted into electronic image data for analysis. This conversion is typically performed by a scanner.

Scanners are well known, so a detailed description is not provided here. Suffice it to say that scanners conventionally employ a line of closely spaced photodetector cells that produce signals related to the amount of the light reflected from successive swaths of the document. Most inexpensive consumer scanners have a resolution of 300 dots per inch (dpi), or a center to center spacing of component photodetectors of about 84 microns. Higher quality scanners of the sort found in most professional imaging equipment and photocopiers have resolutions of 600 dpi (42 microns), 1200 dpi (21 microns), or better.

Taking the example of a 300 dpi scanner (84 micron photodetector spacing), each 250 micron region 12 on the security document will correspond to about a 3×3 array of photodetector samples. Naturally, only in rare instances will a given region be physically registered with the scanner so that nine photodetector samples capture the luminance in that region, and nothing else. More commonly, the image is rotated with respect to the scanner photodetectors, or is longitudinally misaligned (i.e. some photodetectors image sub-parts of two adjoining regions). However, since the scanner oversamples the regions, the luminance of each region can unambiguously be determined.

In one embodiment, the scanned data from the document is collected in a two dimensional array of data and processed to detect the embedded calibration information. The scanner data is then processed to effect a virtual re-registration of the document image. A software program next analyzes the statistics of the re-registered data (using the techniques disclosed in my prior writings) to extract the bits of the embedded data.

(Again, the reference to my earlier watermark decoding techniques is exemplary only. Once scanning begins and the data is available in sampled form, it is straightforward to apply any other watermark decoding technique to extract a correspondingly-encoded watermark. Some of these other techniques employ domain transformations (e.g. to wavelet, DCT, or Fourier domains, as part of the decoding process).)

In a variant embodiment, the scanned data is not assembled in a complete array prior to processing. Instead, it is processed in real-time, as it is generated, in order to detect embedded watermark data without delay. (Depending on the parameters of the scanner, it may be necessary to scan a half-inch or so of the document before the statistics of the resulting data unambiguously indicate the presence of a watermark.)

In other embodiments, hardware devices are provided with the capability to recognize embedded watermark data in any document images they process, and to respond accordingly.

One example is a color photocopier. Such devices employ a color scanner to generate sampled (pixel) data corresponding to an input media (e.g. a dollar bill). If watermark data associated with a security document is detected, the photocopier can take one or more steps.

One option is simply to interrupt copying, and display a message reminding the operator that it is illegal to reproduce currency.

Another option is to dial a remote service and report the attempted banknote reproduction. Photocopiers with dial-out capabilities are known in the art (e.g. U.S. Pat. No. 5,305,199) and are readily adapted to this purpose. The remote service can be an independent service, or can be a government agency.

Yet another option is to permit the copying, but to insert forensic tracer data in the resultant copy. This tracer data can take various forms. Steganographically encoded binary data is one example. An example is shown in U.S. Pat. No. 5,568,268. The tracer data can memorialize the serial number of the machine that made the copy and/or the date and time the copy was made. To address privacy concerns, such tracer data is not normally inserted in all photocopied output, but is inserted only when the subject being photocopied is detected as being a security document. (An example of such an arrangement is shown in FIG. 12.)

Desirably, the scan data is analyzed on a line-by-line basis in order to identify illicit photocopying with a minimum of delay. If a security document is scanned, one or more lines of scanner output data may be provided to the photocopier's reprographic unit before the recognition decision has been made. In this case the photocopy will have two regions: a first region that is not tracer-marked, and a second, subsequent region in which the tracer data has been inserted.

Photocopiers with other means to detect not-to-be-copied documents are known in the art, and employ various response strategies. Examples are detailed in U.S. Pat. Nos. 5,583,614, 4,723,149, 5,633,952, 5,640,467, and 5,424,807.

Another hardware device that can employ the foregoing principles is a standalone scanner. A programmed processor (or dedicated hardware) inside the scanner analyzes the data being generated by the device, and responds accordingly.

Yet another hardware device that can employ the foregoing principles is a printer. A processor inside the device analyzes graphical image data to be printed, looking for watermarks associated with security documents.

For both the scanner and printer devices, response strategies can include disabling operation, or inserting tracer information. (Such devices typically do not have dial-out capabilities.)

Again, it is desirable to process the scanner or printer data as it becomes available, so as to detect any security document processing with a minimum of delay. Again, there will be some lag time before a detection decision is made. Accordingly, the scanner or printer output will be comprised of two parts, one without the tracer data, and another with the tracer data.

Many security documents already include visible structures that can be used as aids in banknote detection (e.g. the seal of the issuer, and various geometrical markings on U.S. currency). In accordance with a further aspect of the present invention, a security document is analyzed by an integrated system that considers both the visible structures and watermark-embedded data.

Visible security document structures can be sensed using known pattern recognition techniques. Examples of such techniques are disclosed in U.S. Pat. Nos. 5,321,773, 5,390,259, 5,533,144, 5,539,841, 5,583,614, 5,633,952, 4,723,149, 5,692,073, and 5,424,807 and laid-open foreign applications EP 649,114 and EP 766,449.

In photocopiers (and the like) equipped to detect both visible structures and watermarks from security documents, the detection of either can cause one or more of the above-noted responses to be initiated (FIG. 12).

Again, scanners and printers can be equipped with a similar capability—analyzing the data for either of these security document hallmarks. If either is detected, the software (or hardware) responds accordingly.

Identification of security documents by watermark data provides an important advantage over recognition by visible structures—it cannot so easily be defeated. A security document can be doctored (e.g. by white-out, scissors, or less crude techniques) to remove/obliterate the visible structures. Such a document can then be freely copied on either a visible structure-sensing photocopier or scanner/printer installation. The removed visible structure can then be added back in via a second printing/photocopying operation. If the printer is not equipped with security document-disabling capabilities, image-editing tools can be used to insert visible structures back into image data sets scanned from such doctored documents, and the complete document can then be freely printed. By additionally including embedded watermark data in the security document, and sensing same, such ruses will not succeed.

(A similar ruse is to scan a security document image on a non-security document-sensing scanner. The resulting image set can then be edited by conventional image editing tools to remove/obliterate the visible structures. Such a data set can then be printed—even on a printer/photocopier that examines such data for the presence of visible structures. Again, the missing visible structures can be inserted by a subsequent printing/photocopying operation.) Desirably, the visible structure detector and the watermark detector are integrated together as a single hardware and/or software tool. This arrangement provides various economies, e.g., in interfacing with the scanner, manipulating pixel data sets for pattern recognition and watermark extraction, electronically re-registering the image to facilitate pattern recognition/watermark extraction, issuing control signals (e.g. disabling) signals to the photocopier/scanner, etc.

While the foregoing apparatuses are particularly concerned with counterfeit deterrence, the embedded markings can also serve other functions. Examples include banknote processing machines that perform denomination sorting, counterfeit detection, and circulation analysis functions. (I.e., banknotes with certain markings may be distributed through known sources, and their circulation/distribution can subsequently be monitored to assist in macro-economic analyses.)

From the foregoing, it will be recognized that various embodiments provide techniques for embedding multi-bit binary data in security documents, and provide for the reliable extraction of such data even in the presence of various forms of corruption (e.g. scale and rotation).

(To provide a comprehensive disclosure without unduly lengthening the following specification, applicants incorporate by reference the patents and applications cited above.)

Having described and illustrated the principles of my invention with reference to several illustrative embodiments, it will be recognized that these embodiments are exemplary only and should not be taken as limiting the scope of my invention. Guided by the foregoing teachings, it should be apparent that other watermarking, decoding, and anti-counterfeiting technologies can be substituted for, and/or combined with, the elements detailed above to yield advantageous effects. Other features disclosed in my earlier applications can similarly be employed in embodiments of the technology detailed herein. (Thus, I have not here belabored application of each of the techniques disclosed in my earlier applications—e.g. use of neural networks for watermark detectors—to the present subject matter since same is fairly taught by reading the present disclosure in the context of my earlier work.)

While the technology has been described with reference to embodiments employing regular rectangular arrays of cells, those skilled in the art will recognize that other arrays—neither rectangular nor regular—can alternatively be used.

While the embodiments have described the calibration patterns as adjuncts to digital watermarks—facilitating their detection, such patterns have utility apart from digital watermarks. One example is in re-registering scanned security document image data to facilitate detection of visible structures (e.g. detection of the seal of the issuer, using known pattern recognition techniques). Indeed, the use of such calibration patterns to register both watermark and visible structure image data for recognition is an important economy that can be gained by integration a visible structure detector and a watermark detector into a single system.

Although security documents have most commonly been printed on paper (e.g. cotton/linen), other substrates are gaining in popularity (e.g. synthetics, such as polymers) and are well (or better) suited for use with the above-described techniques.

The embodiments detailed above can be implemented in dedicated hardware (e.g. ASICs), programmable hardware, and/or software.

In view of the many possible embodiments to which the principles of the above-described technology may be put, it should be recognized that the detailed embodiments are illustrative only and should not be taken as limiting the scope of my invention.

Image Patterns that Constitute Digital Watermarks

Steganographic techniques for unobtrusively embedding digital data in images are well known. For example, widely used image editing programs such as Adobe PhotoShop which is marketed by Adobe Corporation, CorelPHOTO-PAINT which is marketed by Corel Corporation, and Microgrfix Webtricity which is marketed by Micrographic Corporation contain plug-ins or subroutines which can add watermarks to images and which can read watermarks. Systems for adding watermarks to images are described in many patents including U.S. Pat. No. 5,636,292, U.S. Pat. No. 5,862,260, and U.S. Pat. No. 5,748,783. Such systems are also described in the technical literature such as in the "Communications of the ACM" published July 1998 Vol. 41, No 7 pages 31 to 77. The teaching and information in the above referenced material is hereby incorporated herein as background information.

In some watermark detecting and reading systems the original image is considered to be noise when the system is detecting and reading the actual watermark data. A major task faced by the designers of watermark reading systems is how to detect a relatively weak watermark signal in view of the noise signal created by the image data itself.

Many documents and images include a background image. In some documents such as checks, passports, etc. the background image is used as a security feature to inhibit alteration or duplication. In many documents, the background consists of a series of lines. Such lines are designed to both present a pleasing appearance and to inhibit duplication or alteration of the documents. U.S. patent application Ser. No. 09/074,034, filed May 6, 1998 and Ser. No. 09/127, 502, filed Jul. 31, 1998 (which correspond to PCT/US99/ 08252, now published as WO99/53428 and PCT/US99/ 14532, now published as WO00/07356) describe how the width of lines can be varied to carry a watermark.

Figure 13:
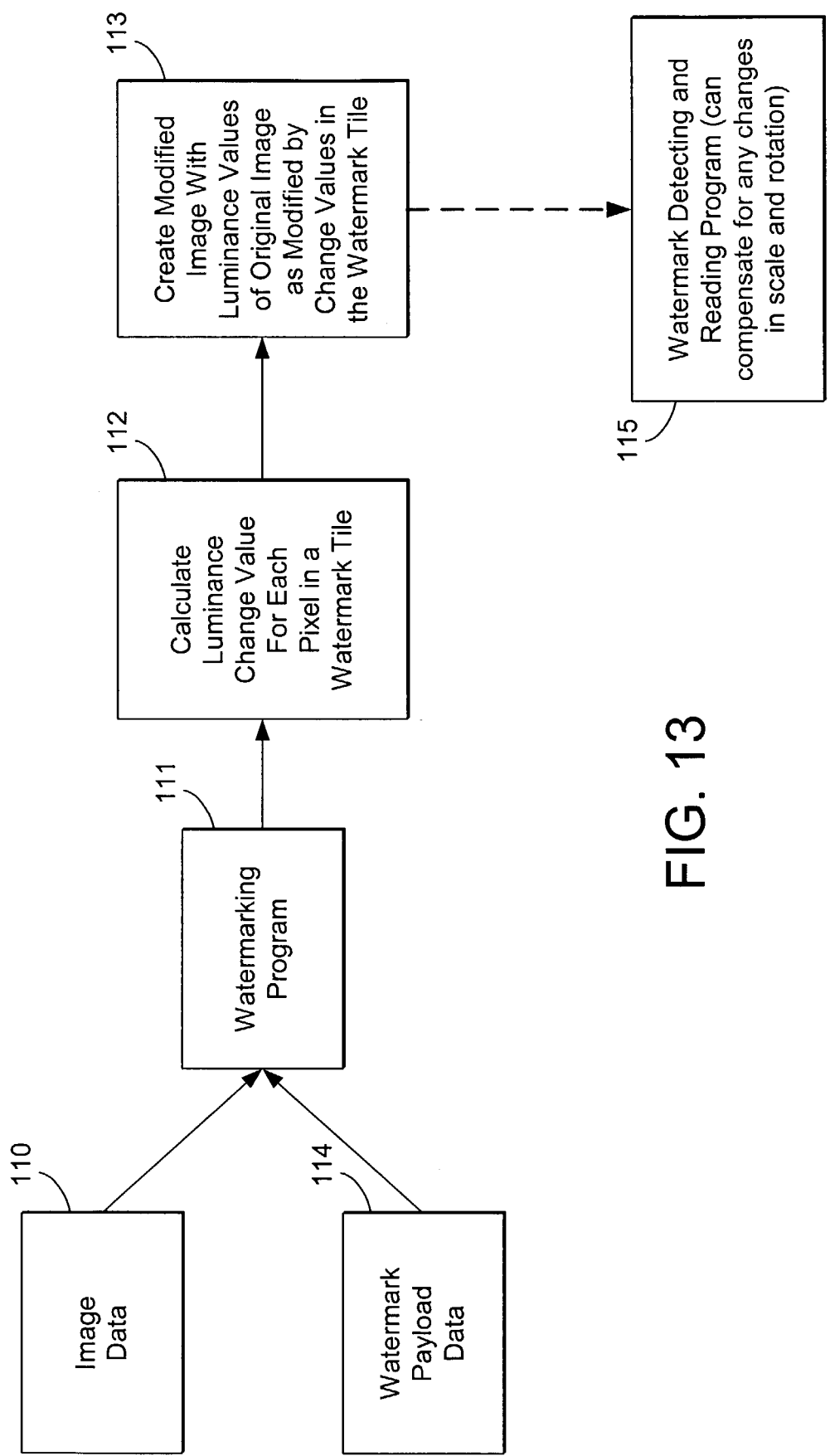
FIG. 13 shows a prior art watermarking system.

Some digital watermarking technology modifies an image by changing the luminance values of the pixels in the image in such a way that the modified image carries digital data (referred to as watermark payload data). As shown in FIG. 13, one example of a watermarking system begins with an image 110 and watermark payload data 114. A watermarking program 111 calculates a luminance change value 112 for each pixel in a watermark tile. The input image is divided into areas corresponding to the size of the watermark tile. A modified image is generated by taking the luminance values in each area of the original image and changing it by an amount equal to the change values in the corresponding position in the watermark tile. Watermark detecting and reading program 114 can read the watermark payload data by detecting the changes in luminance values while considering the values from the original image as "noise". Watermark detecting and reading program 114 can read the payload data not withstanding changes in scale and rotation of the modified image. Such a system is for example shown in copending patent application serial number Ser. No. 09/503,881 filed Feb. 14, 2000 (the material in which is hereby incorporated herein by reference).

This disclosure describes a method for designing a pattern of lines in such a manner that the pattern itself carries watermark payload data. That is, lines are drawn so that the resulting image carries watermark data. This is in contrast to systems in which watermark payload data is used to modify a preexisting image. In one embodiment, a conventional watermarking program is used to calculate luminance change values in a watermark tile (i.e. luminance change values corresponding to a desired watermark payload). The luminance change values are used to control the formation of lines on an output image. The weight, length and character (i.e. straight or wavy etc.) of the lines can be selected to create any desired aesthetic effect so long as the placement of the lines is controlled by the luminance change values in the watermark tile. Lines are drawn to form an image in such a way that the placement and direction of the lines carry watermark data. The payload data can be read from an image created according to this method using a conventional watermark reading program.

As a first step in this embodiment, the luminance change values in a watermark tile are calculated using a watermarking program. Next the values so calculated are quantified into a relative small number of levels. For example, the watermarking change values calculated by the watermarking program may have 256 different values (0 to 255). This embodiment takes those values and quantifies them into ten different levels. An output image is divided into areas called bumps, one bump for each pixel in the watermark payload tile. For example, each bump area in the output image could be a rectangular array of pixels. Each bump area in the output is given an index value corresponding to the luminance change value of the corresponding pixel in the payload tile area. Starting at an arbitrary bump area in the output image, a line is drawn to the surrounding bump area with the highest index value and the index value of the bump area where the line started is decreased by one. The process then repeats from the bump area where the line ended. The process can stop when all bump areas have reached an index value of zero, or sooner if a less robust watermark is acceptable.

One embodiment of the method takes the luminance change values in a watermark tile that are calculated by a watermarking program and uses these values to control the construction of lines on an output image. The calculation of the luminance change values may be calculated using existing watermarking programs. For example, the luminance change values can be calculated as described in patent application serial number Ser. No. 09/503,881 filed Feb. 14, 2000, which is hereby incorporated herein by reference. It is noted that in some systems, the watermark data (i.e. the watermark tile) is replicated many times over an image. The first embodiment described herein does not duplicate or replicate the watermark data in the output image; however, as explained later in other embodiments, the watermark data can be replicated in multiple patterns. The watermark payload data can be read from the output image using a conventional watermark reading program.

Figure 14:
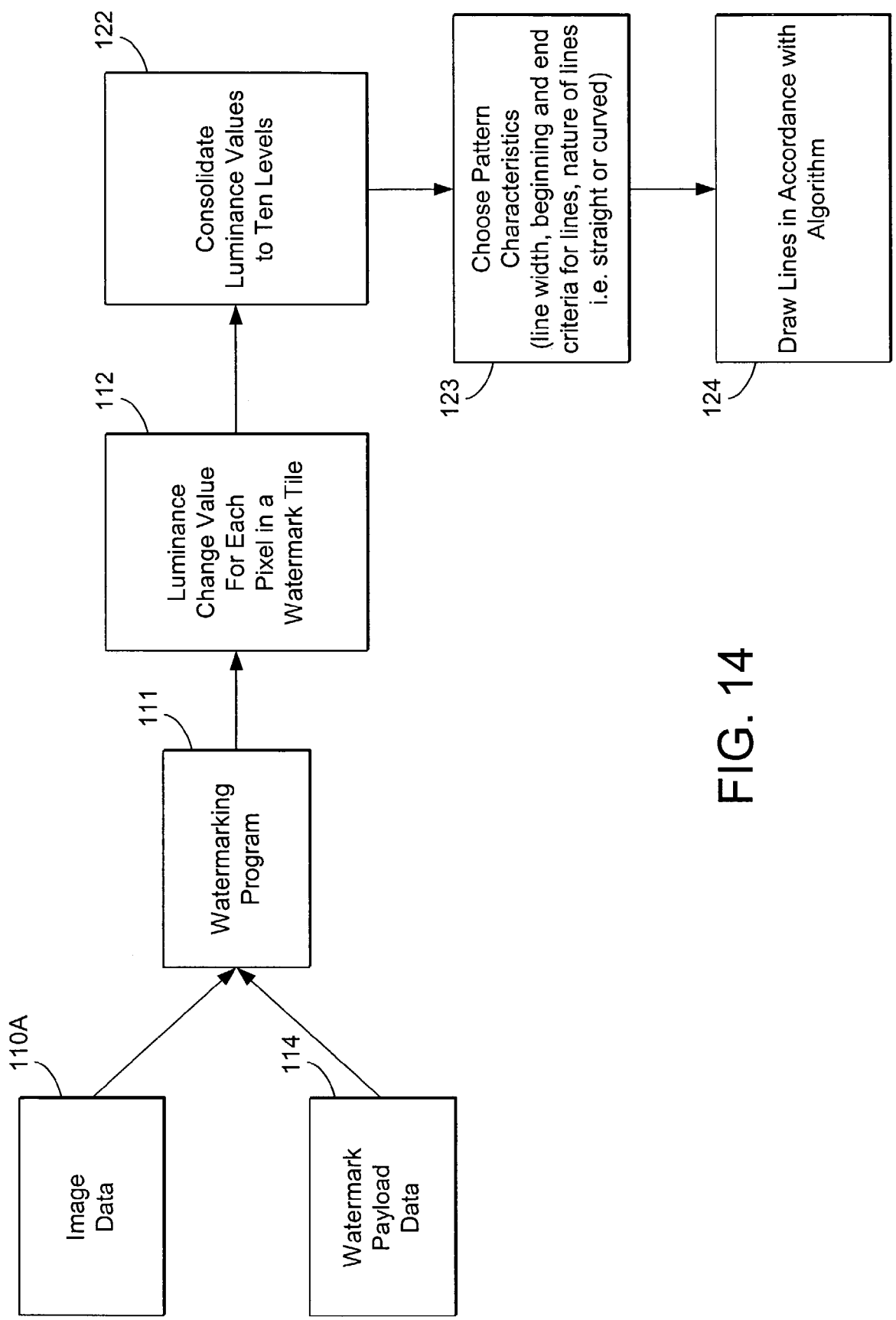
FIG. 14 is an overall system diagram.

As shown in FIG. 14, an embodiment utilizes a watermarking program 111 to calculate luminance change values 112 for each pixel in a watermark tile. The luminance change values 112 in the watermark tile corresponding to a particular watermark payload 114. The original image (herein called a pseudo image) presented to the watermarking program 112 can be a uniformly gray image 110A, that is, an image which has a selected luminance value which is uniform over the entire image. The embodiment described here only uses a pseudo image 110A for the convenience since conventional watermarking programs begin with an image. The effect is the same as if there were no image. In alternate embodiments, the watermark change values 112 could be calculated directly without need for a pseudo image 110A.

The luminance change values in a watermark tile calculated by prior art watermarking program 111 has 256 (0 to 255) luminance levels. To simplify operation of the system, these values are quantified into a much smaller number of levels. For example, the 256 levels can be quantified into ten levels as indicated by box 122 in FIG. 14. The number of levels used (and in fact whether or not there is any reduction in the number of levels) is determined by the degree of complexity one is willing to have in the program. One could use all the levels in the normal watermark tile; however, such a program would require much more time to generate a pattern. Alternately, one could design a watermarking program that only generates ten change values. Such a program would in effect be simpler than the watermarking programs now incorporated in commercial software programs such as those previously referenced.

Figure 15:
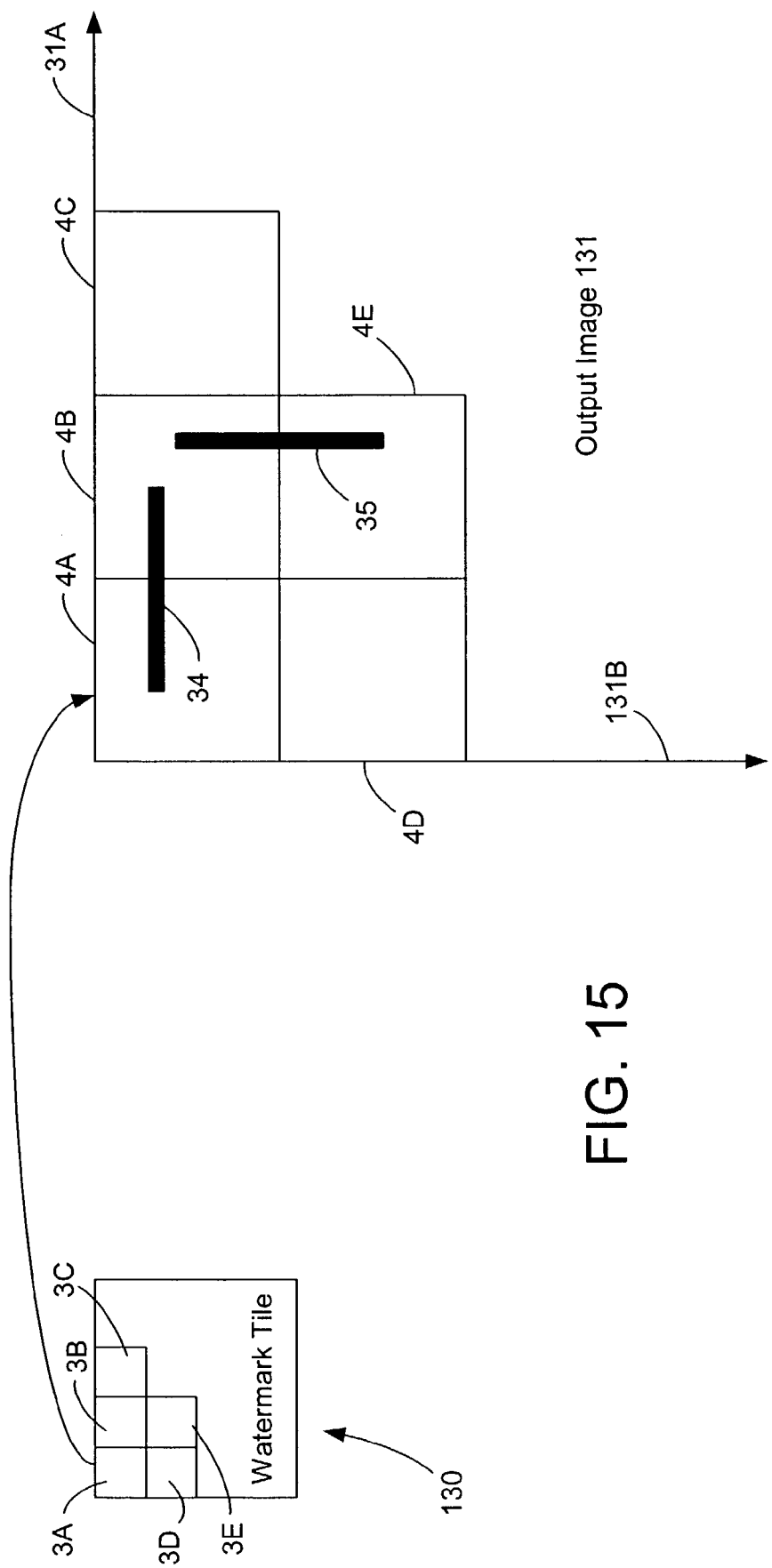
FIG. 15 illustrates the correspondence between the luminance values in a watermark tile and areas in the output image.

One must choose the characteristics of the lines one wants to use. A significant advantage is that the characteristics of the lines can be chosen for aesthetic reasons. For purposes of simplicity of illustration, the lines chosen for the illustrative example shown herein are straight and which have a weight of 4 points. Alternative embodiments can use many different types of lines as explained later., As shown in FIG. 15, this embodiment uses a watermark tile 130 created by a watermarking program 111. The luminance change values in the watermark tile 130 are used to control the drawings of lines in an output image 135. For convenience and clarity of illustration only five pixels 3A to 3E are illustrated in FIG. 15. It should be understood that the watermark tile has many more pixels than shown. For example, a watermark tile generated by a conventional watermarking program has over one thousand pixels. The particular and exact size of the watermark tile is of no particular significance; however, it does affect the number of areas in the output image.

The output image is divided into areas or bumps as shown in FIG. 15. For reference the areas or bumps that are illustrated in FIG. 15 are designated as 4A, 4B, 4C, 4D and 4E. Each area can for example be a block of pixels. The arrows 131A and 131B in FIG. 15 illustrate that the output image has many more area than the five areas 4A to 4E explicitly shown in FIG. 15. There is one area in output image 131 for each pixel in watermark tile 130.

The luminance change values in watermark tile 130 are first quantified into ten levels as indicated by block 122 in FIG. 14. In one embodiment, the luminance change values in watermark tile 130 are generated by a conventional watermarking program, and have luminance change values that range from 0 to 255. It is difficult to deal with that many levels with the present algorithm and it has been found that satisfactory results can be obtained by quantifying the values into many less levels. For example, in one embodiment, the luminance values in the watermark tile are quantified into ten levels. That is, the values from 0 to 255 are divided into ten levels, and each pixel is assigned an index value depending upon which range its luminance change value falls into. (it is noted that the number ten is arbitrary and more or less levels can be selected to meet the needs of a particular embodiment).

Figure 17:
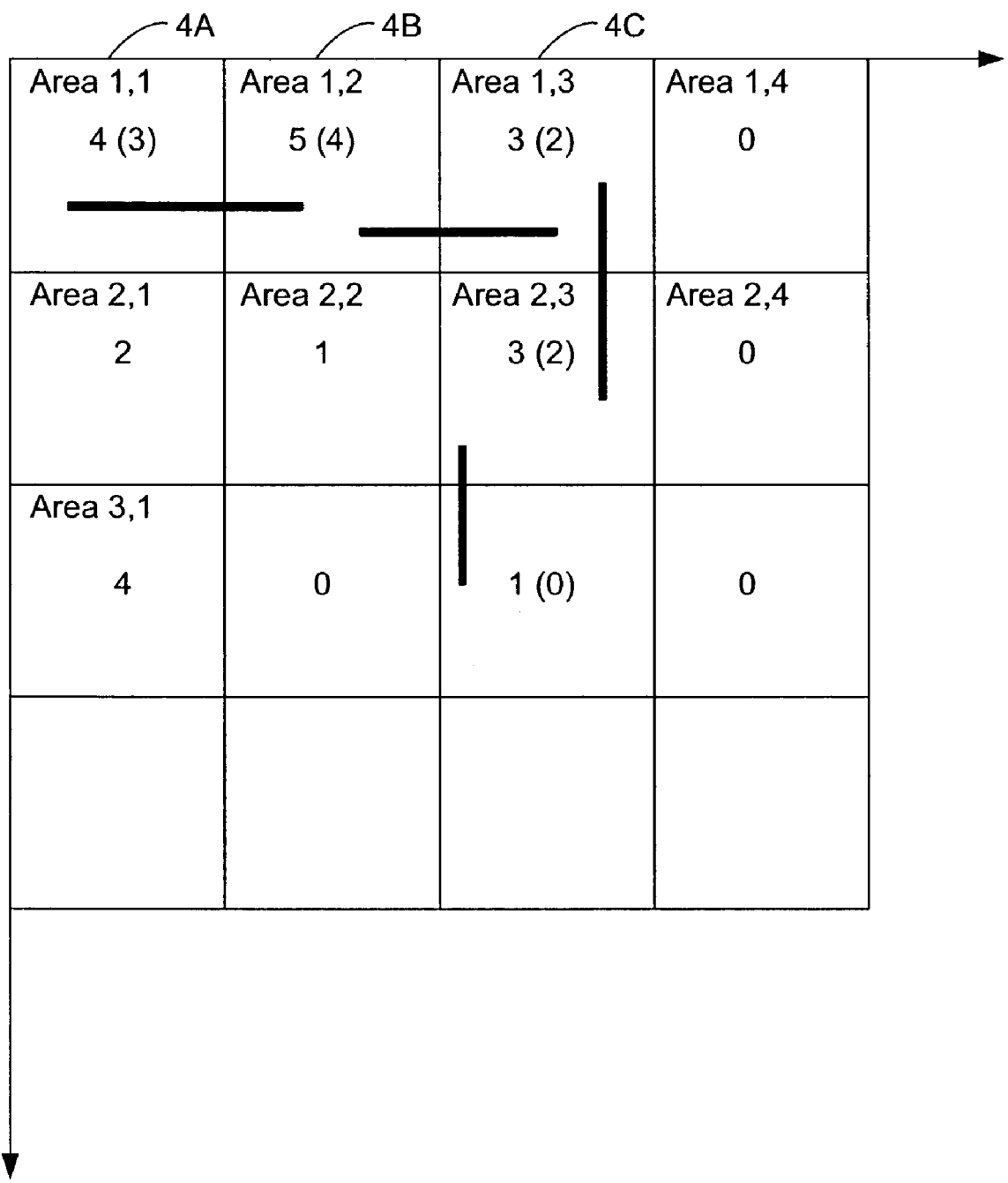
FIG. 17 shows the lines in an output image.

The output image has one area (or bump) for each pixel in the watermark tile and each area in the output image corresponds to one pixel in the watermark tile. The index value calculated for each pixel in the watermark tile is assigned to the corresponding area in the output image. FIG. 17 shows the areas in output image 131 in additional detail. In FIG. 17, the areas are referenced using a conventional matrix notation. For example area 4A is designated as area 1,1, area 4B is designated area 1,2 etc. The starting index value for each area is the index value for the corresponding pixel in the watermark tile. The starting index value for each area is given by the number in bold type in FIG. 17.

The characteristics of the lines in the output must be chosen as indicated by block 123 in FIG. 14. For purposes of simplicity, the example described here utilizes lines that are straight with a weight of four pixels. However, depending upon the artistic effect desired, lines with a wide range of characteristics can be chosen. For example lines that have waves at selected frequencies can be used. Dotted lines can be used. Very thin lines or very heavy lines can be used. Lines that are tapered in width can be used. The above are merely a few examples of the types of lines that can be used to achieve desired artistic effects. However, for ease of illustration, in the example explained here, straight lines with a weight of four pixels are used.

Figure 16:
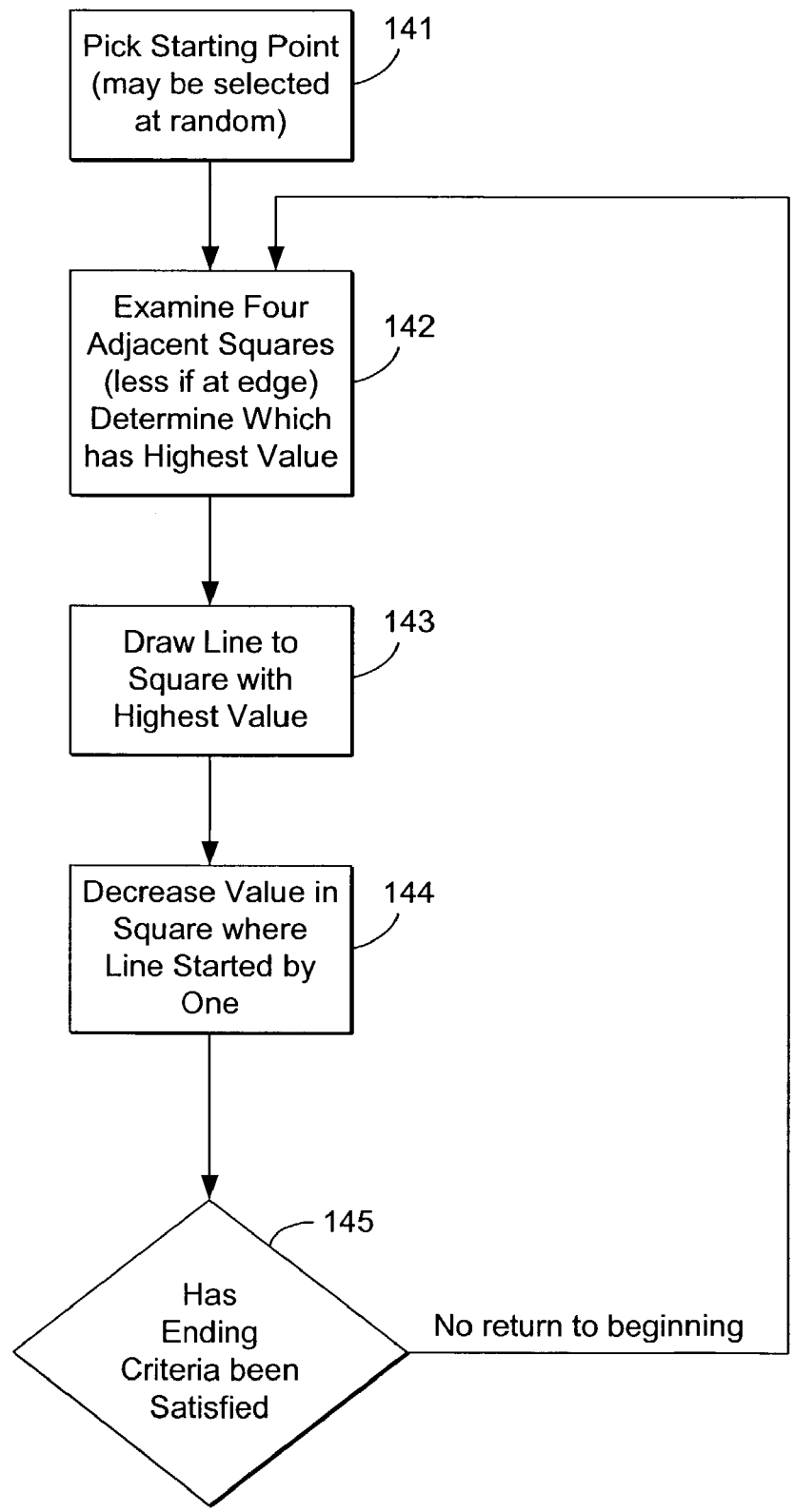
FIG. 16 is a flow diagram of an embodiment.

Lines are drawn in the output image using the algorithm shown in FIG. 16. First, a starting point is picked as indicated by block 144. For purposes of the example described here, area 1,1 is chosen as the starting point. It is however, noted that the location of the starting point can be chosen arbitrarily. Next as indicated by block 142, the index values of the area adjacent to the starting area are examined and the area with the highest index value is selected. In the present example, there are only two adjacent areas, namely areas 1,2 and 2,1. Area 1,2 has an index value of 5 and area 2,1 has an index value of 2. A line is drawn from the starting area to the adjacent area with the highest index value as indicated by block 143. In this case area 1,2 is the adjacent area with the highest index value. The starting location of the line can be chosen randomly. For simplicity in the present embodiment, lines are drawn only horizontally or vertically; however, in alternative embodiments, lines can be drawn at angles selected randomly or according to any desired pattern. The length of the lines can be chosen randomly so long as a line begins and ends in the designated area.

After a line is drawn from one square to another square, the index value of the square where the line started is decreased by one as indicated by block 145. This is shown in FIG. 17 by the numbers in parenthesis. Hence for the line described above, the index value for area 1,1 is reduced from 4 to 3. The process then repeats. Area 1,3 is the area adjacent to area 1,2 that has the high index value (excluding the area where the line to area 1,2 originated). A line is therefore drawn from area 1,2 to area 1,3 and the index value of area 1,2 is reduced from 5 to 4. Following the same algorithm, a line is next drawn to area 2,3 and then a line is drawn to area 3,2.

The process can continues until all areas have an index of zero. However, it has been found that the process can be stopped after the number of lines drawn equals the number of squares. Other criteria can be used to determine when to stop the process. Basically, by trial and error, one can determine when a watermark with sufficient intensity has been embedded in the image or when the desired artistic effect has been achieved. If prior to the time one cares to terminate the process, one arrives at a point where all the adjacent areas have an index value of zero, one can merely restart the process from an arbitrary location. Likewise if one arrives at a point where all the adjacent areas have the same index value, one can arbitrarily choose where to draw a line.

Figure 18:
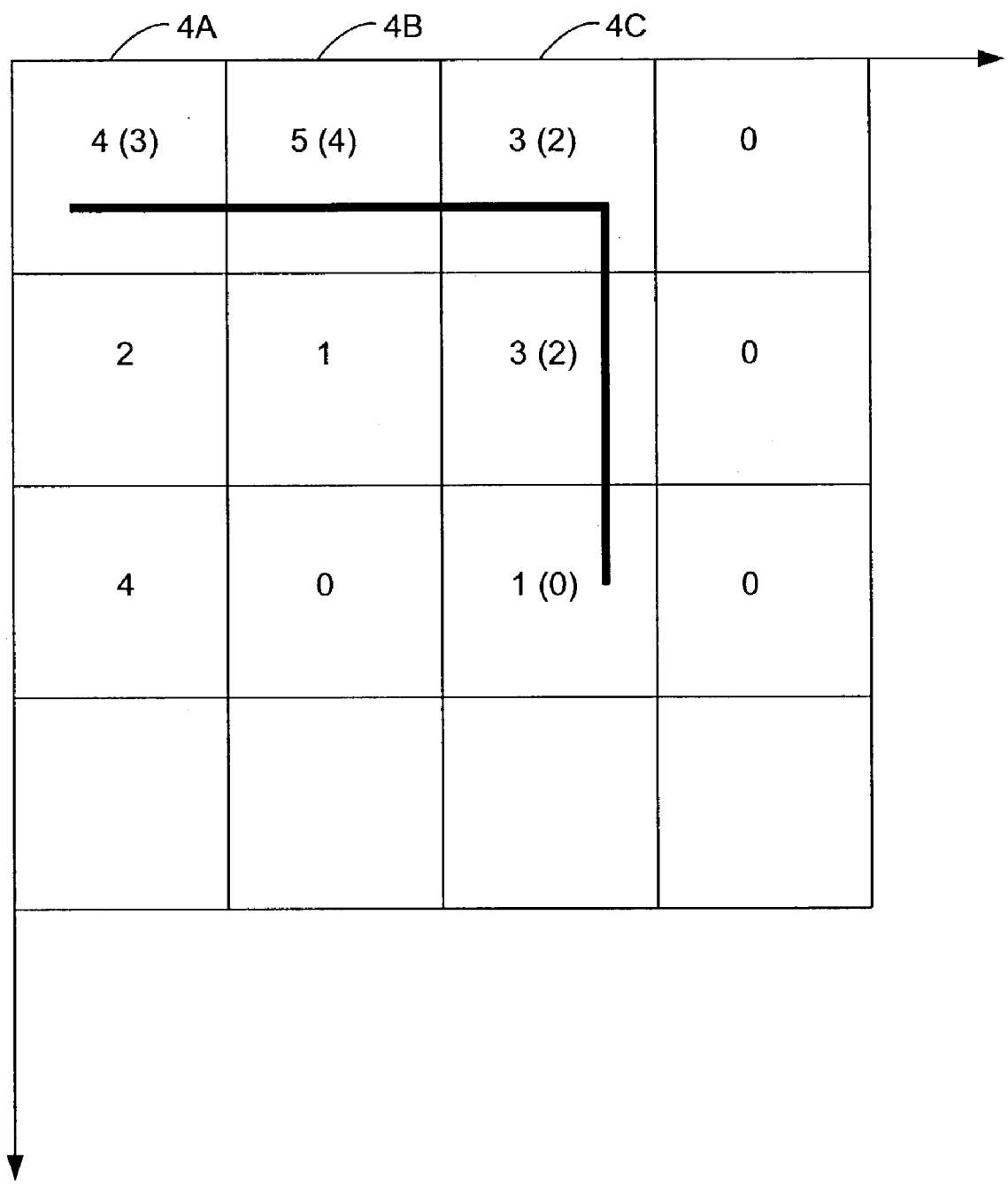
FIG. 18 shows an alternative arrangement of lines in an output image.
Figure 19:
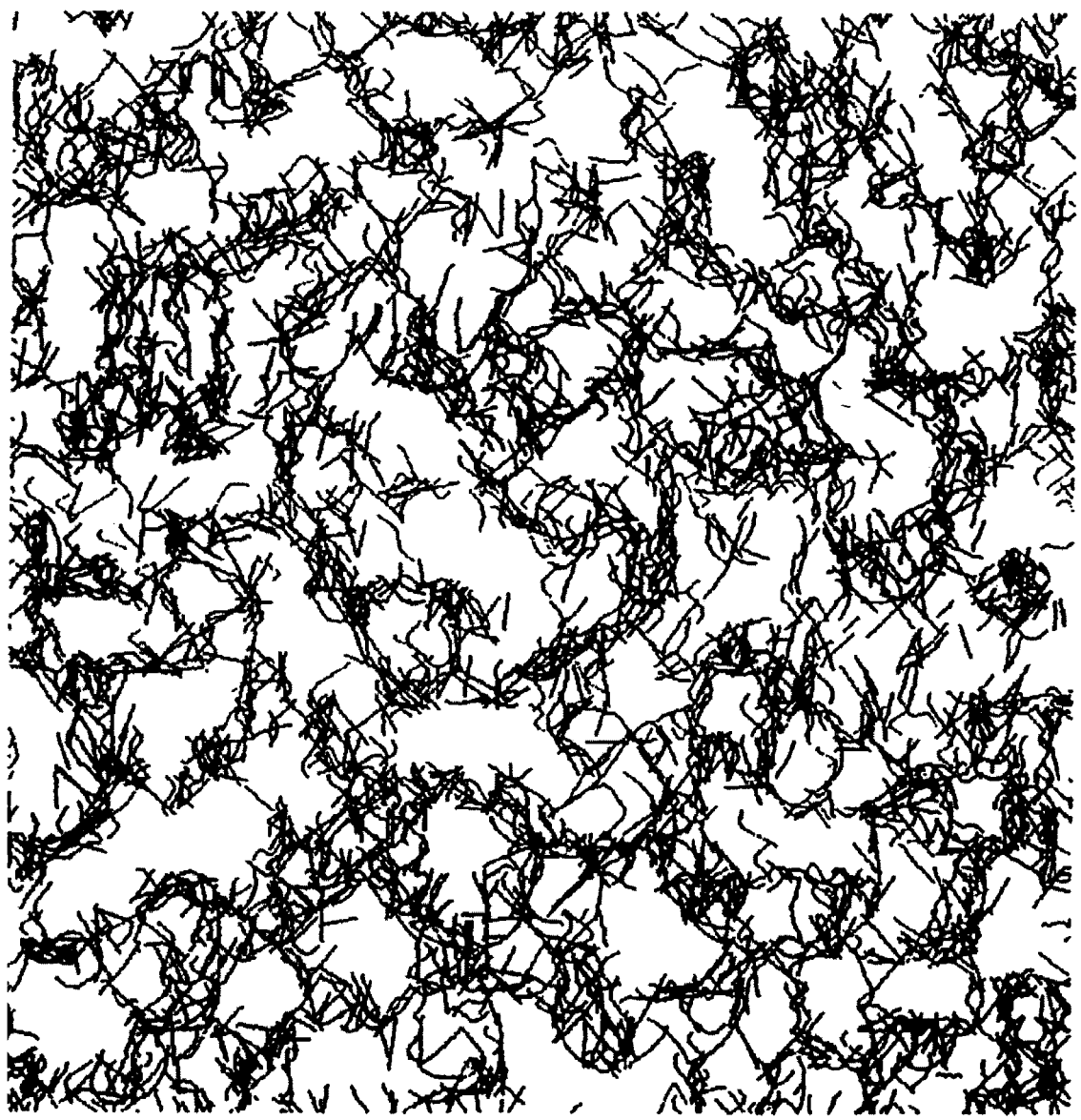
FIG. 19 is an overall diagram of an output image.

In the embodiment shown, the lines begin at random locations. FIG. 18 shows an example where each line begins from the terminal point of the previous line. Again here the length of the lines is chosen randomly.

In the embodiment shown above, lines are drawn between areas in the output image. It is noted that artifacts other than lines could be used. For example, instead of lines, one could use circles, or stars, or small images of birds. In fact one can use any artifact that would create a change in luminance, which could be detected by a watermark reading program.

Conventional watermarking programs redundantly encode the watermark data in an image. This increases reliability and robustness of the watermark. Likewise with the present embodiment, a pattern could be repeated in an output image. The repeated pattern could be the same pattern, or it could be a different pattern carrying the same watermark. That is, one could have multiple identical patterns in an output image. Alternatively, one could have multiple patterns which differ from each other but which carry the same watermark payload data. For example, different patterns can be generated by merely starting the process at a different location in the image. Alternatively, one could have different patterns using different types of lines, or for example patterns where the starting area for the line drawing algorithm was at a different area in the output image. The size of the areas or bumps in the output image have the same affect as do the size of the areas or bumps in an image modified by a conventional watermarking program.

The applications for this technique include not only all image types, but also printed representations of all types (from security to commercial printing) independent of the medium. For example, instead of using a generic pattern in the background of a photo-ID document (i.e., a passport), the designer can elect to use a pattern that contains a watermark instead. In turn, this watermark may tie the photograph to this particular document.

Full sheets of paper could be pre-printed for use in security/commercial printing applications. This paper could then be used for any number of applications, from people printing at home on paper that indicates to a copier that it shouldn't be copied, to commercial printers protecting their products from unwanted use.

Outside of just the print/image world these patterns could manifest themselves in other media, such as fabric, glass, plastics, paper, etc. Any media that can support variations in its make-up or construction could make use of this technique to carry a signal.

While the invention has been shown and described with respect to preferred embodiments thereof, it should be understood that various changes in form and detail can be made without departing from the spirit and scope of the invention.

We claim:

1. A method of generating a machine readable code for a printed document, the method comprising:
    generating a variable auxiliary message comprising message values;
    mapping the message values to a two dimensional pattern of areas on the document;
    wherein the areas each comprise an arrangement of pixels on the printed document;
    depending on a value of the message mapped to a corresponding area, assigning a visible structure to the corresponding area, wherein different visible structures are assignable to a single value of the message to create a visible design having a desired aesthetic appearance.

2. The method of claim 1 wherein the visible structures form a pattern of lines of varying lengths.

3. The method of claim 2 wherein the different visible structures that are selectively assignable to the single value comprise lines of varying length.

4. The method of claim 1 wherein the auxiliary message is repeated and represented by different patterns in the two dimensional pattern.

5. The method of claim 4 wherein the manner in which the message is represented by the different patterns is dependent on a key.

6. The method of claim 1 wherein the auxiliary message is redundantly spread over the two dimensional pattern using a random number.

7. The method of claim 6 wherein the message comprises binary values and the binary values are randomized into substantially equal probability of two different binary values.

8. The method of claim 1 wherein detection of the machine readable code is integrated with detection of a visible seal.

9. The method of claim 1 wherein the pattern includes a visible calibration signal that forms an artistic element of the printed document.

10. The method of claim 9 wherein the machine readable code is embedded within the artistic element.

11. The method of claim 1 wherein the machine readable code carries information that conelates with or is redundant to readable information on the printed document for authentication of the document by comparing at least a part of the machine readable code with the readable information printed on the document.

12. A computer readable medium on which is stored instructions for performing the method of claim 1.

13. A method of generating a watermarked image, said image being divided into a plurality of areas, said method comprising:
    generating a watermark tile that includes luminance change values for pixels which will embed a watermark in an image,
    associating said areas in said image with pixels in said watermark tile,
    drawing lines between said areas in said image, the lines being dependent at least in part on a relationship of the luminance change values of the pixels in the watermark tile that correspond to the areas where said line is drawn.

14. The method recited in claim 13 where said areas each have an index value that is related to the change value of the associated pixel in said watermark tile.

15. The method in claim 14 where each line is drawn from an area to an adjacent area that has the highest index value.

16. A physical image on a substrate which includes a plurality of lines, said image being divided into a plurality of areas, said image being created by lines drawn between said areas so as to carry a machine readable digital watermark payload, wherein an amount of a line drawn over an area is varied in accordance with a value of a machine readable data element of the digital watermark to be conveyed in the area.

17. A system for creating an image that carries a watermark payload, said system comprising,
   means to generate a watermark tile including change values that represent a watermark payload,
   means for drawing lines in an image in response to the change values in said watermark tile, whereby said image carries a watermark a payload, wherein an amount of a line drawn over an area is varied in accordance with a value of a machine readable data element of the watermark tile to be conveyed in the area.

18. A physical document that includes a plurality of printed artifacts, said artifacts being created at selected positions in a pattern so as to carry a machine readable variable message payload, the message payload being repeated, scrambled, and mapped to areas within the pattern based on a key used to generate encoded message elements, the message elements having values that correspond to the artifacts, wherein the artifact assigned to a particular value of an element is variable to enable selection of artifacts in a pattern having a desired aesthetic appearance.

19. A physical document that includes a plurality of printed visual objects, said visual objects being created at selected positions so as to carry a machine readable variable message payload encoded into a pattern of the visual objects, the message payload being repeated, scrambled, and mapped to areas on the pattern based on a key used to generate encoded message elements, the message elements having values that correspond to the visual objects, wherein the artifact assigned to a particular value of an element is variable to enable selection of artifacts in the pattern having a desired aesthetic appearance.

20. A system for generating a watermarked image, said image being divided into a plurality of areas, said system comprising,
   a memory;
   a program stored in the memory for generating a watermark tile which includes change values for the areas which will embed a digital watermark in an image, areas in said image being associated with change values in said watermark tile,
   a program stored in the memory for drawing lines between said areas in said output image, the beginning and end of said lines being dependent at least in part on the change values of the pixels in the watermark tile that correspond to the area where said lines begin and end wherein an amount of a line drawn over an area is varied in accordance with a value of a machine readable data element of the watermark tile to be conveyed in the area; and
   a processor for executing the program for generating a watermark tile and the program for drawing lines.

21. A method of drawing an image which includes a machine readable digital watermark payload, said image being divided into a plurality of areas,
   generating a watermark tile that specifies change values that will represent a watermark payload, and
   drawing lines between areas in said image in response to the values in said watermark tile; wherein said watermark tile has change values for a plurality of pixels, and wherein said image includes at least as many areas as there are pixels in said watermark tile.

22. The method of claim 21 wherein the lines drawn between areas depend upon the change value in the corresponding pixel in said watermark tile.

23. The method of claim 22 wherein the change values in said watermark tile are quantified into fewer levels than the number of levels used to represent change values in the watermark tile.

24. The method of claim 23 wherein said change values are quantified into ten levels.

25. A method of drawing an image in response to change values in a message tile generated by a machine readable message coding program, said tile having change values for a particular number of pixels that represent a particular payload,
   quantifying said change values into a selected number of index values,
   dividing said image into areas, each area being associated with one pixel change value in said tile, each area having an index value related to the associated pixel change value in said tile,
   drawing a line in said image starting at a selected area by drawing a line from said selected area to an adjacent area having the highest index value,
   decreasing the index value of the area where said line started,
   drawing another line from the area where said line terminated to the adjacent area having the highest index value, and
   repeating said decreasing and said drawing another line for a number of iterations, whereby an auxiliary message reading program is operable to read said particular payload encoded in the lines in said image.

* * * * *